United States Patent

Norell

[11] Patent Number: 6,134,304
[45] Date of Patent: *Oct. 17, 2000

[54] GENERAL ANALYSIS SYSTEM

[75] Inventor: Lennart Bror Norell, Älvsjö, Sweden

[73] Assignee: Telefonaktiebolaget LM Ericsson, Stockholm, Sweden

[*] Notice: This patent is subject to a terminal disclaimer.

[21] Appl. No.: 07/974,165

[22] Filed: Nov. 10, 1992

[51] Int. Cl.⁷ .................................................. H04M 11/00
[52] U.S. Cl. .............................. 379/100.05; 379/106.01; 379/106.08
[58] Field of Search ........................ 379/201, 68, 100.05, 379/106.08, 106.01

[56] References Cited

U.S. PATENT DOCUMENTS

| | | |
|---|---|---|
| 4,656,603 | 4/1987 | Dunn . |
| 4,688,195 | 8/1987 | Thompson et al. . |
| 4,864,497 | 9/1989 | Lowry et al. . |
| 4,868,770 | 9/1989 | Smith et al. . |
| 4,910,691 | 3/1990 | Skeirik . |
| 4,953,080 | 8/1990 | Dysart et al. . |
| 4,965,742 | 10/1990 | Skeirik . |
| 5,051,898 | 9/1991 | Wright et al. . |
| 5,068,812 | 11/1991 | Schaefer et al. . |
| 5,101,491 | 3/1992 | Katzeff . |
| 5,212,771 | 5/1993 | Gane et al. .............................. 395/160 |
| 5,323,452 | 6/1994 | Dickman et al. ....................... 379/201 |
| 5,371,895 | 12/1994 | Bristol ..................................... 364/191 |

*Primary Examiner*—Reba I. Elmore
*Attorney, Agent, or Firm*—Jenkens & Gilchrist, P.C.

[57] ABSTRACT

A general analysis system for performing an analysis used in the control of an industrial process. The general analysis system comprises a general analysis program for performing at least one analysis on a set of data and an analysis control data for controlling the analysis of the data set. According to the present invention, the general analysis program comprises a plurality of analysis primitives and the analysis control data comprises a plurality of analysis modules. An analysis may be constructed from a set of analysis modules and performed by interpreting this set using at least one of the analysis primitives.

52 Claims, 9 Drawing Sheets

Microfiche Appendix Included
(1 Microfiche, 45 Pages)

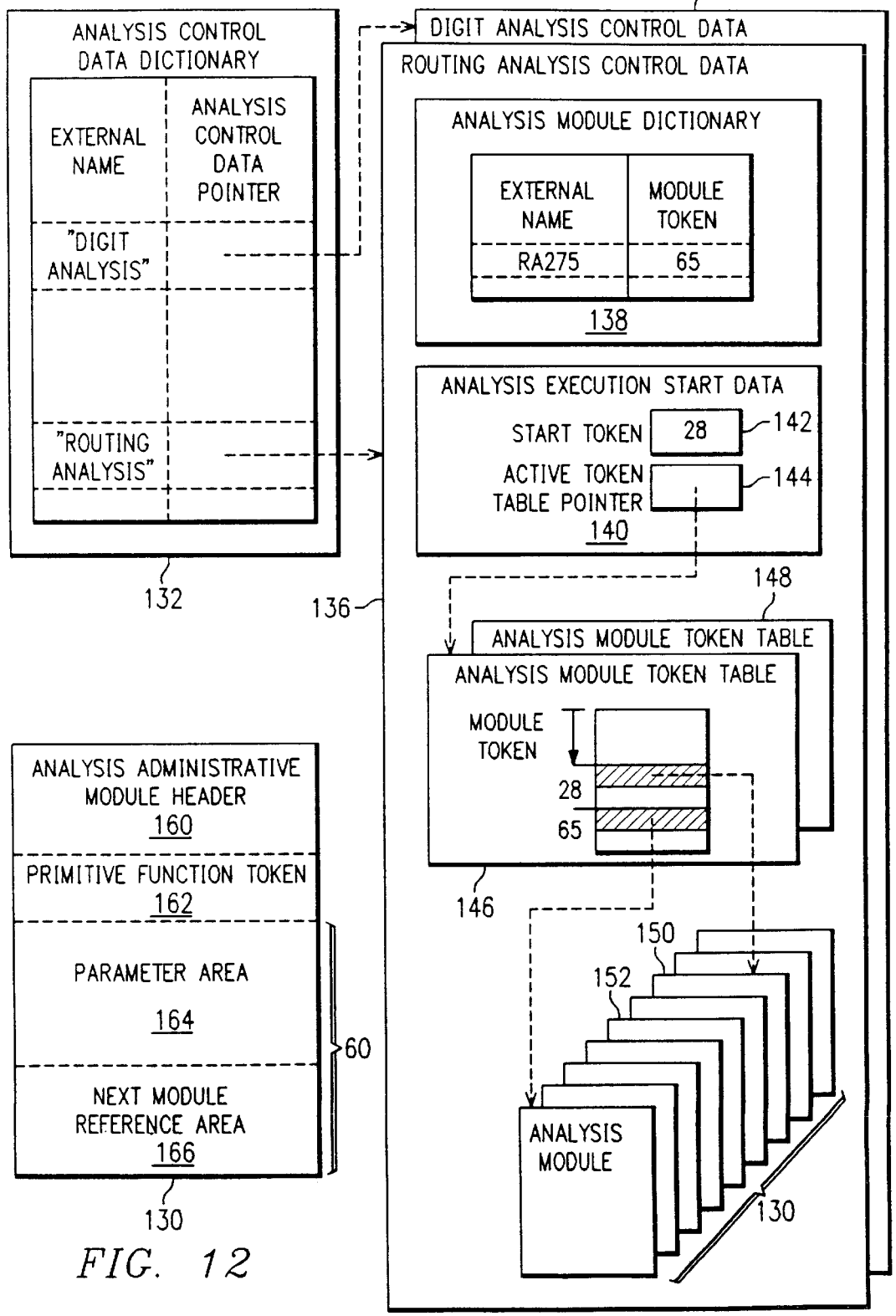

GENERAL ANALYSIS SYSTEM

REFERENCE TO MICROFICHE APPENDIX

Reference is hereby made to a microfiche appendix comprising one (1) sheet containing forty-five (45) frames comprising Appendices A–C which show the use of analysis primitive functions in the preferred embodiment of the present invention relating to call processing in a telecommunications system, said microfiche appendix entitled "System and Method for Processing and Analyzing Telephone Calls in a Telephone Exchange" by Applicant Lennart Bror Norell.

BACKGROUND OF THE INVENTION

1. Field of the Invention

The present invention relates to a general analysis system for performing diverse analysis of information in a variety of settings including, in particular, a telephone switch.

2. History of the Prior Art

Broadly speaking, the present invention embraces a novel approach to the analysis of data which replaces what heretofore has been accomplished by implementing each analysis algorithm in an analysis-specific computer program. Instead of creating different computer programs for different types of analyses as is conventional in the art, the novel approach of the present invention contemplates the creation of one generic analysis program and the specification of the differences between analyses in the data acted upon by the generic analysis program. This approach may, therefore, be characterized as data-driven rather than built-in analysis, software-driven. The data may be defined by the user in a simple format which, unlike computer programming language formats, requires little or no special expertise, knowledge, training or skills.

It will be appreciated from the detailed description which follows that the novel approach of the present invention has merit in a broad spectrum of industrial applications. In general, any industrial process control system, which must be customized for different installations and periodically modified at each installation to account for new inputs to, and outputs from, the process, may benefit from the teachings of the present invention. A prime example of such an industrial process may be found in the field of telecommunications and, specifically, in the connection of calls between telephone subscribers. For purposes of the following discussion, the term "switch" or "switching machine" includes, as applicable, a toll traffic control switch, a dedicated cellular switch or a local exchange switch.

Telephone service today is provided to a multiplicity of customers or telephone subscribers through centralized switching. A centralized switching machine in a central office controls the switching of calls to and from local telephone subscribers and communicates with other central offices in the network via trunks. Each central office must perform certain functions in handling a simple call. For example, the central office must monitor and sense that a customer desires service when the customer's telephone goes off-hook and the customer originates a call. Once the central office recognizes that an origination has taken place, i.e., detects the off-hook status of a given line, the central office must connect to the line means for notifying the customer, via a dial tone, for example, that the central office is ready to receive information from the customer, and means for receiving this information. Information, e.g., the called number, is entered by the customer using a rotary dial or a touch-tone keypad and is received and recorded at the central office. This information must then be interpreted by the central office equipment to identify the locale of the called line.

If the called party and the calling party are served by the same central office, i.e., the call is an intraoffice call, a busy test is made of the called line, and if the called line is idle, the called party is alerted, e.g., rung via an audible ring tone. The called line is supervised awaiting an answer by the called party or abandonment by the calling party. If the called party answers, a speech path is established between the parties. The speech path is then supervised during conversation and is disconnected when one of the parties hangs up and the line goes on-hook.

If, on the other hand, the called party is served by a different central office, i.e., the call is an interoffice call, a search is made for an idle direct trunk to the central office which serves the called party or to an intermediate central office which is able to further the progress of the call to the central office of the called party. Information about the called number is transmitted from the originating central office and received by the intermediate central office which delivers the information to the terminating central office. If the called party's line is busy, or the call is blocked somewhere in the network, or the necessary interoffice trunks are all busy, the calling customer is informed via an audible busy, fast busy or reorder tone.

The switching functions incident to handling the simple telephone call illustrated above may be succinctly classified as signal reception, signal interpretation, storage, path selection, network path provision and control, and signal transmission. In addition to these customer service functions, the switching system must register usage and perhaps also calculate, on a periodic basis, the charges associated with the usage originating from a particular directory number. Modern switching machines perform at least some of these and other functions under electronic (wired logic or stored program) control. In particular, the concepts of real time processing, i.e., operation at a rate great enough to keep pace with rapidly changing events, and interactive operation, i.e., ability to interact with, and to accept and process information from, a human on a multi-transaction basis, which have been traditionally associated with computer systems are being increasingly applied to telephone switching machines.

FIG. 1 illustrates schematically some of the many analysis functions which are performed in establishing communications between two telephone subscribers A and B. Subscriber A uses a telephone unit 10 to place a call to subscriber B and is connected to a local exchange 12. The local exchange 12 detects the request for service, i.e., the arrival of the dialed digits, from the A-subscriber and performs a number of analysis procedures (functions) including, in order, a service analysis (SA) 14, a destination analysis (DA) 16 and a routing analysis (RA) 18. While, for the sake of simplicity, only three analysis functions, SA 14, DA 16 and RA 18, are shown in FIG. 1, several more analysis functions may be performed in the local exchange 12 to complete the call from the A-subscriber to the B-subscriber.

The purposes of the SA 14 are to identify the calling subscriber (A-subscriber, in this instance) and to verify that the calling subscriber is entitled to make the call given his or her subscription status and other pertinent considerations. The directory number of the A-subscriber may be examined for these purposes. The main purpose of the DA 16 is to determine the location at which the B-subscriber is connected to the network, i.e, the location of telephone unit 24. For this purpose, the dialed number (B-subscriber telephone number) is interpreted in light of the location of the A-subscriber (same exchange or a different exchange), whether or not the B-subscriber belongs to a centrex group (centrex is a service comparable in features to PBX but implemented with some or all of the control in the central office), and other pertinent factors.

The aim of the RA 18 is to locate a network route through which the call from the A-subscriber to the B-subscriber may be connected. This analysis depends not only on the final destination of the call,. i.e., the B-subscriber location, but also on traffic congestion in the network, i.e., the load on different routes through the network, the nature of the call, i.e., analog or digital, and similar indicia of network capacity. Based on the results of the RA 18, the local exchange 12 may route the call to an intermediate (toll or transit) exchange 20 which, in turn, routes the call through a local exchange 22 to the telephone unit 24 of the B-subscriber.

FIG. 2 illustrates stored program control of the analysis functions performed in the local exchange 12 of FIG. 1. According to FIG. 2, each analysis, e.g., SA 14, DA 16, and RA 18, is implemented with a different analysis program 30. The input to each analysis program 30 includes call parameters, e.g., A-subscriber number and area code, B-subscriber number and area code, etc., which are supplied from a predetermined array of parameters 32. The parameters are analyzed with reference to a data structure 34 which is specified for each type of analysis and which interprets combinations of parameter values and produces an analysis result. Each analysis program 30 and each associated data structure 34 may be controlled by the network operator through a man-machine interface 36. In particular, the network operator may apply appropriate values to the data in each data structure 34 so that the related analysis will produce a desired result given the location of the local exchange 12 in the network, the numbering plan, etc. For example, the operator may choose to alter the manner in which calls to a certain destination are routed within the network by applying appropriate values to the data in the data structure 34 associated with the RA 18.

The prior art analysis approach illustrated in FIG. 2 suffers from a number of drawbacks and shortcomings. In particular, because each different and specialized analysis requires a specific analysis program 30, a specialized (analysis-specific) set of data configured in a specific data structure 34 must be prepared and entered through a specific man-machine interface 36 for each analysis program 30. For example, a data structure 34 defining the numbering plan to be used in the DA 16 and another data structure 34 defining the desired routing patterns in the trunk network to be used in the RA 18 must be specifically prepared for each of these data sets. A considerable amount of programming time and effort by highly skilled personnel must, therefore, be invested in creating and developing each different analysis and the total analysis package. Furthermore, the type of input parameters to, and the nature of output results from, each analysis are all predetermined. Consequently, introduction of new types of parameters or results necessitates either the reprogramming of existing versions or the releasing of new versions of the relevant analysis program(s) 30 and data structure(s) 34, all at significant expense.

In practice, i.e., during actual operation, it is often necessary or desirable to modify a particular analysis function in order, for example, to redirect traffic when the network is overloaded, to measure different parameters such as the volume or density of traffic through a certain part of the network, to include additional parameters in the analysis, and so on. According to prior art analysis systems, such as the system illustrated in FIG. 2, however, the network operator and/or the switch vendor may be burdened with the virtually impossible task of anticipating all future modifications to the network or to a particular switch in the network, or at the very least, with the frequent task of integrating new code with existing code and debugging the resulting combination.

In light of these drawbacks and shortcomings of prior art systems, it is an object of the present invention to provide a general analysis system which is not specific to any single analysis and which can be used for performing a wide variety of analyses notwithstanding the peculiarities of each analysis performed. The general analysis system may be used as a generic analysis system in lieu of the extensive and rather expensive sets of specialized programs and data structures of prior art systems.

It is another object of the present invention to provide a general analysis program and an analysis control data structure within the general analysis system which can be used to perform any desired analysis.

It is yet another object of the present invention to provide a general analysis system in which new functions may be defined in, and new parameters intended to influence the analysis may be indicated from, the analysis control data. New functions and new parameters may be added to an analysis, without reprogramming the general analysis program, by using operator-supplied data in the general analysis program, or customer-supplied data in the analysis control data, which forms the foundation for the analysis.

It is a further object of the present invention to provide a call control data structure which stores input parameters and output results and which further enables parameters to be indicated from the analysis control data.

SUMMARY OF THE INVENTION

The structure and operation of the present invention are described in detail hereinafter. Briefly, however, the present invention provides a general analysis system for performing an analysis used in the control of an industrial process. The general analysis system comprises a general analysis program for performing at least one analysis on a set of data and an analysis control data for controlling the analysis of the data set. According to the present invention, the general analysis program comprises a plurality of analysis primitives and the analysis control data comprises a plurality of analysis modules. An analysis may be constructed from a set of analysis modules and performed by interpreting this set using at least one of the analysis primitives.

In another aspect, the present invention provides a system for processing telephone calls comprising at least one exchange and, in each exchange, a general analysis program including a plurality of analysis primitives, an analysis control data including a plurality of analysis modules and a call control data including a plurality of call records, one for each telephone call through the exchange. The analysis modules may be grouped into a plurality of analysis structures, each of which controls a different analysis. The analysis structures may include, for example, a routing analysis structure and a destination analysis structure.

In yet another aspect, the present invention provides a method for controlling an industrial process comprising the steps of storing a plurality of parameters for the industrial process, executing a plurality of analysis modules, each of which controls a part of an analysis of said parameters and at least one of which generates a result from the analysis, and controlling the industrial process based on the generated result. The parameters may include input generated from the industrial process, data defining the characteristics of the industrial process, and the result(s) of earlier-executed analyses. The result may be an intermediate or a final result from the analysis.

In a further aspect, the present invention provides a method for compiling and executing at least one analysis, used to control an industrial process, comprising the steps of providing a plurality of high-level analysis primitives each of which includes a build procedure and a do procedure, compiling a plurality of control-level analysis modules using the build procedure of at least one of the high-level analysis primitives, with the control-level analysis modules forming a tree structure which represents an analysis, and executing each control-level analysis module in the tree structure using the do procedure of the high-level analysis primitive which was used to compile the control-level analysis module.

BRIEF DESCRIPTION OF THE DRAWINGS

The present invention will be better understood and its numerous objects and advantages will become apparent to those skilled in the art by reference to the following drawings in which like numerals or numbers designate like objects:

FIG. 11 is a schematic illustration of the structure of a preferred embodiment for the analysis control data of the present invention;

FIG. 12 is a schematic illustration of the structure of a certain type of analysis modules in the preferred embodiment of the analysis control data shown in FIG. 11;

DETAILED DESCRIPTION

A preliminary overview of some of the salient features of the present invention may offer some guidance and assistance in understanding the detailed description of the preferred embodiment which follows.

General Overview

The construction of the general analysis system of the present invention permits the entire specification of an analysis within the analysis control data. In other words, the answers to the questions of what will be analyzed and how it will be analyzed may be specified by the operator in certain elements (hereinafter referred to as "analysis modules") in the analysis control data. The construction of the analysis control data component of the general analysis system of the present invention permits the man-machine interface to fully accommodate the needs of the operator in a user-friendly manner. Furthermore, the construction of the general analysis program component of the general analysis system of the present invention is largely independent of the subject matter to be analyzed and the intended result(s) of the analysis. The particular subprograms (hereinafter referred to as "analysis primitives") in the general analysis program to be executed in an analysis are indicated by analysis modules in the analysis control data. The analysis modules in the analysis control data may also indicate the execution of other subprograms which reside instead in the analysis control data. In addition to performing analyses, the subprograms of the present invention may, for example, collect analysis data from other switches in the network or register technical or statistical information relating to the behavior of the network or to any of the telephone subscribers connected to the network.

Figure 1:
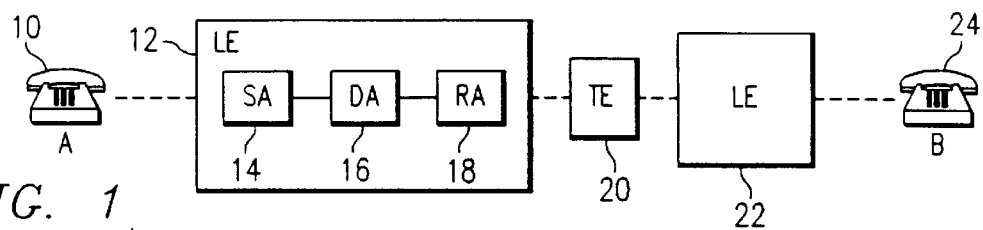
FIG. 1 is a schematic illustration of some of the analysis functions which are performed by a local exchange in the process of establishing communications between two telephone subscribers, A and B.
Figure 2:
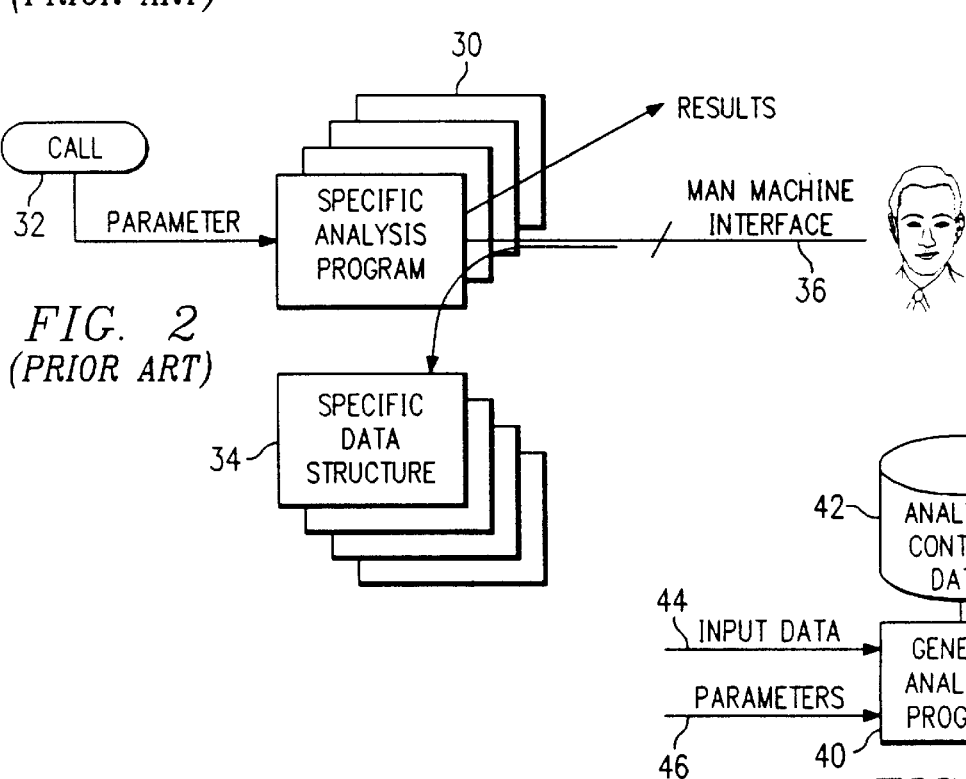
FIG. 2 is a schematic illustration of the prior art stored program control of the analysis functions performed in the local exchange shown in FIG. 1.
Figure 3:
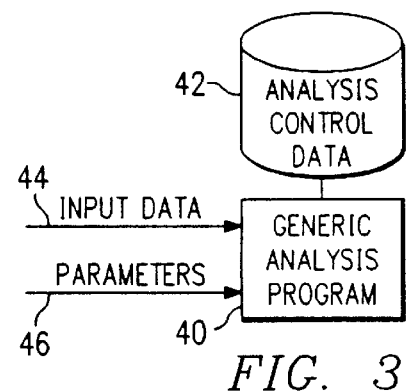
FIG. 3 is a simplified schematic block diagram of the general analysis system of the present invention.

Referring now to FIG. 3, a simplified schematic block diagram of the general analysis system of the present invention may be seen. Instead of a plurality of analysis programs and corresponding data structures, the general analysis system incorporates a generic analysis program (hereinafter referred to as the "general analysis program") 40 which performs a desired analysis, among a plurality of available analyses, under the control of an analysis control data 42. Broadly speaking, the analysis control data 42 provides a "blueprint" for controlling the behavior of a particular analysis of a set of data which may be different for each execution of this analysis, e.g., different data sets for different telephone calls to be similarly analyzed. As shown in FIG. 3, the data set being analyzed may, in general, consist of input data 44 which is received by the general analysis program 40 when called upon to execute a particular analysis (or a series of analyses), and parameters 46 which may be accessed by the general analysis program 40 during the course of performing one or more analyses.

Figure 4:
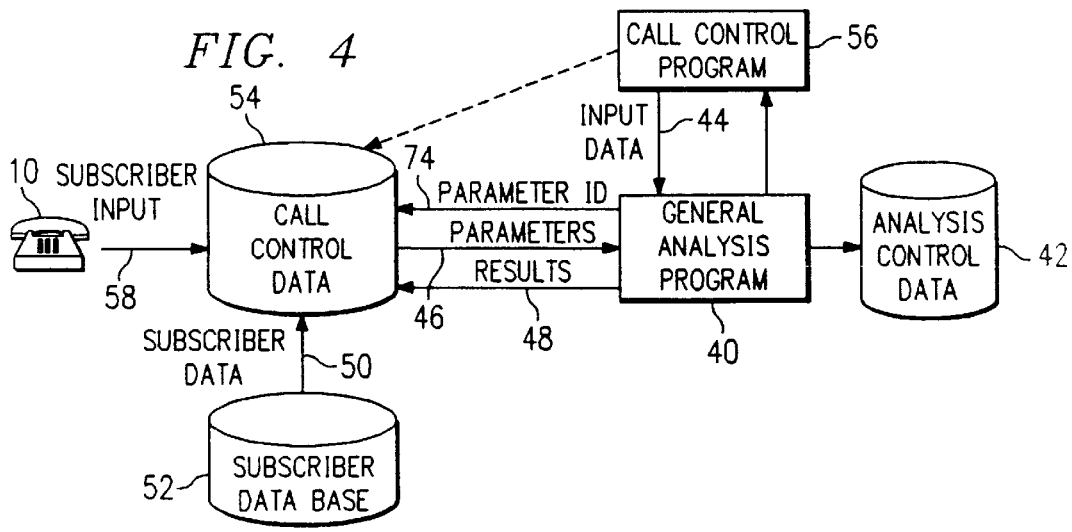
FIG. 4 is an expanded schematic block diagram of the general analysis system shown in simplified form in FIG. 3.

The input data 44 may include different types of information depending on the designer's choice and the needs of a particular application. In general, the input data 44 may include one or more data sets (actual parameters) to be analyzed, pointers or references to one or more relevant structures which contain data sets to be analyzed, and any other useful information. The types of parameters 46 are largely specific to each application of the general analysis system. As shown in FIG. 4, the input data 44 may be supplied by the entity, e.g., a computer program, which calls the general analysis program 40 to execute an analysis, while the parameters 46 may be supplied by a number of different sources in the application.

Referring next to FIG. 4, an expanded schematic block diagram of the general analysis system shown in more simplified form in FIG. 3 may now be seen. This diagram illustrates the application of the present invention to the processing of telephone calls in a telephone switch or exchange. In FIG. 4, the input data 44 is supplied to the general analysis program 40 from a call control program 56 which exercises overall control of the processing of telephone calls in the exchange, including the ordering of execution calls to the general analysis program 40 to perform different analyses, e.g., digit or routing analysis, of each telephone call. In this case, the parameters 46 comprise various call-related data which is stored in a call control data structure 54. As shown in FIG. 4, the parameters 46 stored in the call control data 54 may be read (accessed) by the general analysis program 40 and the call control program 56.

In the preferred embodiment of the present invention discussed in detail hereinafter, a plurality of call records are stored in the call control data 54. Each call record contains a data set, i.e., a set of call parameter values, for a particular call through the exchange (all calls records contain the same set of call parameter locations but the parameter values in each call record are specific to a particular call). In the preferred embodiment, the input data 44 includes a pointer or a reference to the particular call record, i.e., the desired set of call parameter values 46, for the call being analyzed (in the preferred embodiment, the analysis control data 42 comprises several different analysis structures and substructures and the input data 44 also includes an identification of the particular analysis structure to be executed by the analysis program 40). As explained in detail hereinafter, the general analysis program 40 uses a parameter identification (ID) 74 to access (read) the value of a particular parameter 46 from one of the locations in the call record indicated by the input data 44.

Referring again to FIG. 4, the call control data 54 is seen to include subscriber data 50 from a subscriber data base 52 and subscriber input 58 from a telephone subscriber, e.g., the digits entered (dialed) by an originating subscriber (A-subscriber) using the telephone unit 10. The subscriber data 50 may include, for example, the area code of the A-subscriber, the class of service (business or residential customer), and other similar information. Each call record in the call control data 54, therefore, may store both "temporary" data which is valid only for a particular call, i.e., subscriber input 58, and "semi-permanent" data which is valid for all calls from a particular subscriber, i.e., subscriber data 50.

In addition to the subscriber data 50 and the subscriber input 58, the call control data 54 may also include the intermediate or final results 48 of a previous analysis performed by the general analysis program 40 under the control of the analysis control data 42, other call processing results and other data written into the call control data 54 by the call control program 56. The results generated from any analysis may be written by the general analysis program 40 into the call control data 54 and later used by the general analysis program 40 to perform a subsequent analysis or by the call control program 56 to control some external process. For example, the general analysis program 40 may write the results of destination analysis into the call control data 54 for use in performing routing analysis. The results of routing analysis may then be written by the general analysis program 40 into the call control data 54 and used by the call control program 56 to select a trunk for carrying the call through the network.

According to the present invention, the general analysis program 40 uses the input data 44 to generally indicate any one of a large number of analyses to be performed under the control of the analysis control data 42, and further to generally designate a set of parameters 46 in the call control data 54 on which to perform the indicated analysis. However, the specific sequence or order in which the particular parameter values are analyzed, and the specific analysis to be performed on each parameter value by the general analysis program 40, are both determined by the analysis control data 42. For example, in the case of digit (calling number or called number) analysis, the order in which the digits are to be analyzed and the actions to perform on each digit under analysis are indicated by the analysis control data 42 or, more specifically, certain analysis modules which reside in the analysis control data structure for digit analysis.

It is this feature of the analysis control data 42 which allows the use of a generic program, i.e., the general analysis program 40, for performing disparate types of analyses, and the freedom to add new parameters and produce new types of results with only one man-machine interface. The operator need only know the format of one data structure, i.e., the analysis control data 42, and can easily modify existing functions and add new functions during actual operation using the man-machine interface without modifying the code for, or adding a single line of code to, the general analysis program 40. In one sense, the general analysis program 40 acts merely as an interpreter of the analysis control data 42. An embodiment of the general analysis program 40, the analysis control data 42 and the call control data 54 is illustrated in FIGS. 5–6.

Figure 5:
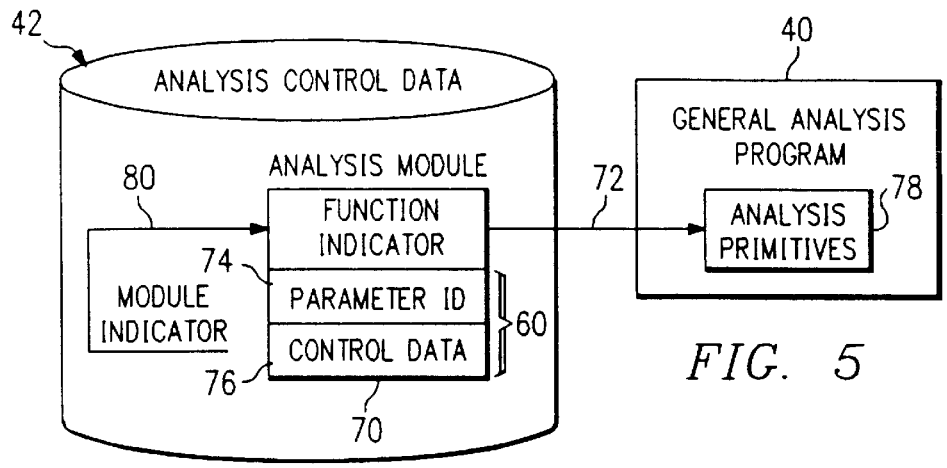
FIG. 5 is a pictorial representation of the construction of the general analysis program and the analysis control data shown in FIGS. 3–4.
Figure 6:
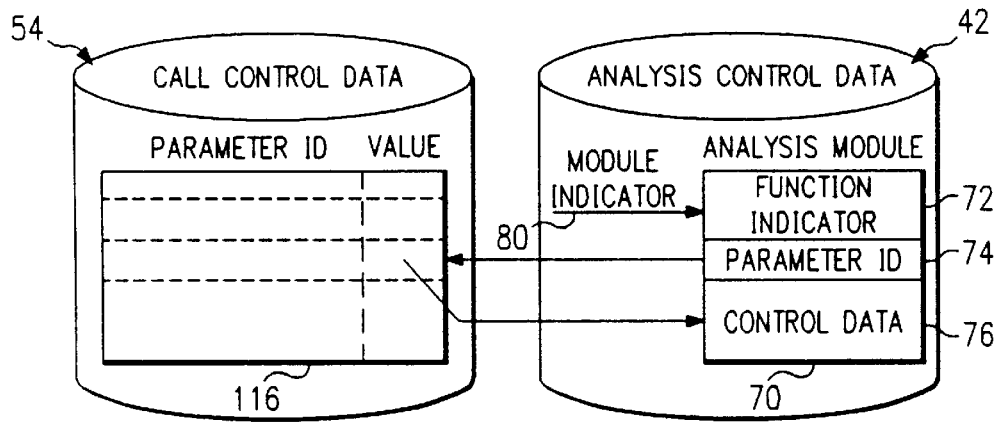
FIG. 6 is a pictorial representation of the construction of the call control data shown in FIG. 4.

Referring next to FIG. 5, a pictorial representation of the construction of the general analysis program 40 and the analysis control data 42 shown in FIGS. 3–4 may now be seen. The general analysis program 40 may be constructed from a plurality of subprograms which are referred to herein as "analysis primitives" or "analysis primitive functions" 78. The analysis control data 42 may be constructed from a plurality of elements which are referred to herein as "analysis modules" 70. In the preferred embodiment of the present invention, several categories of analysis primitives 78 and analysis modules 70 are used. Specifically, the analysis primitives 78 may be either "low-level analysis primitives" or "high-level analysis primitives." Furthermore, the analysis modules 70 may be "low-level analysis modules," "high-level analysis modules" or "control-level analysis modules." Unless the context otherwise requires, the terms "analysis primitives" and "analysis modules" shall be used hereinafter to refer to any or all categories of analysis primitives and analysis modules, respectively, while each individual category will be referred to with an appropriate modifier, i.e., "low-level," "high-level," or "control-level".

Each of the categories of analysis primitives 78 and analysis modules 70 plays a particular role within the preferred embodiment of present invention which is described in detail hereinafter. In the preferred embodiment, the low-level and high-level analysis primitives 78 are built-in primitive functions of different types. The low-level analysis primitives 78 may be used to build low-level analysis modules 70 which, in turn, may be used to build high-level analysis modules 70. The user-built high-level analysis modules 70 and the built-in high-level analysis primitives 78 may both be used to build different types of control-level analysis modules 70 to control a particular analysis. For purposes of the present discussion, FIG. 5 may be considered to show a common type of control-level analysis module 70 in the analysis control data 42.

Referring again to FIG. 5, each of the control-level analysis modules 70 has a predetermined structure which controls a certain part of the total analysis, e.g., analyzing one digit in a telephone number. The exemplary control-level analysis module 70 in FIG. 5 is seen to be comprised of a function indicator 72 and a variable-contents control field 60 which may contain, for example, a parameter identification (ID) 74 and other control data 76. This control-level analysis module 70 is also seen to be identified by a module indicator 80 which may be included in the control field 60 of at least one other control-level analysis module 70 in the analysis control data 42.

With continuing reference to FIG. 5, the function indicator 72 designates (references) one of the high-level analysis primitives 78 which are resident in the general analysis program 40. As will become clear from the discussion of the preferred embodiment, however, the function indicator 72 may instead designate one of the high-level analysis modules 70 which function in a manner similar to the high-level analysis primitives 78 but which are resident in the analysis control data 42. The referenced high-level analysis primitive 78, or the referenced high-level analysis module 70, determines the specific nature and layout of, and conversely is capable of interpreting, the contents of the control field 60 in the referencing control-level analyses module 70, i.e., in this case, the parameter ID 74 and the control data 76. The parameter ID 74 indicates the location of the call parameter value (data subset) to be analyzed by the control-level analysis module 70. The control data 76 may include, for example, the module indicators 80 of analysis modules 70 from which a next analysis module 70 is selected for execution based on the analysis of the parameter value indicated by the parameter ID 74.

Referring next to FIG. 6, a pictorial representation of the construction of the call control data 54 shown first in FIG. 4 may now be seen. As discussed earlier in connection with FIG. 4, the call control data 54 includes subscriber data 50, subscriber input 58, earlier analyses results written by the general analysis program 40, other processing results and other data written by the call control program 56. Thus, all data relating to a call from a telephone subscriber may be stored in the call control data structure 54 and accessed by or through the general analysis program 40, with the aid of a parameter ID 74, during the analysis of the call. As shown in FIG. 6, the call control data 54 includes a call record 116 for each call being analyzed. The call record 116 comprises a set of parameter values each of which is identified by and associated with a unique parameter ID 74, i.e., the call record 116 may be visualized as a table of parameter IDs 74 and corresponding call parameter values.

With continuing reference to FIG. 6, the analysis of each call parameter value, i.e., of one of the values in the call record 116, will be controlled by at least one control-level analysis module 70 in the analysis control data 42. The high-level analysis primitive 78 (or the high-level analysis module 70) referenced by the function indicator 72 in the control-level analysis module 70 may retrieve (read) the desired parameter value from the call record 116 by matching the parameter ID 74 found in the control-level analysis module 70 with the corresponding parameter ID 74 associated with that value in the call record 116. Once the parameter value has been retrieved, it may be used by the analysis primitive 78 which is interpreting the control field 60 in the control-level analysis module 70 to, for example, select an appropriate outlet from the control-level analysis module 70, i.e., to select the module indicator 80 of the next analysis module 70 to be interpreted.

An Exemplary Analysis

At the beginning of an analysis, the general analysis program 40 receives a pointer to an analysis structure in the analysis control data 42 and a pointer to a call record (parameter record) 116, i.e., a set of parameters 46, in the call control data 54. The general analysis program interprets the contents of a certain analysis module 70, e.g., the analysis module 70 in FIGS. 5–6, in the analysis control data 42. The parameter indicated by the parameter ID 74 in the analysis module 70 is fetched from the call control data 54 and the analysis primitive 78 indicated by the function indicator 72 is called from the general analysis program 40 and executed. The analysis then continues with the next analysis module 70 which is indicated by the module indicator 80 selected from the control field 60 of the analysis module 70. This process may be repeated in like fashion until the analysis is completed. Consequently, any desired analysis may be constructed by linking a number of analysis modules 70, one to another, through the module indicator(s) 80 in their control fields 60. In other words, where one or more of the analysis modules 70 has an outlet to another analysis module 70, i.e., includes a module indicator 80 which points to another analysis module 70, an analysis may be carried out by selecting a path of outlets through the analysis control data on the basis of the parameters 46 indicated by the input data 44 and other factors as illustrated in FIG. 7.

Figure 7:
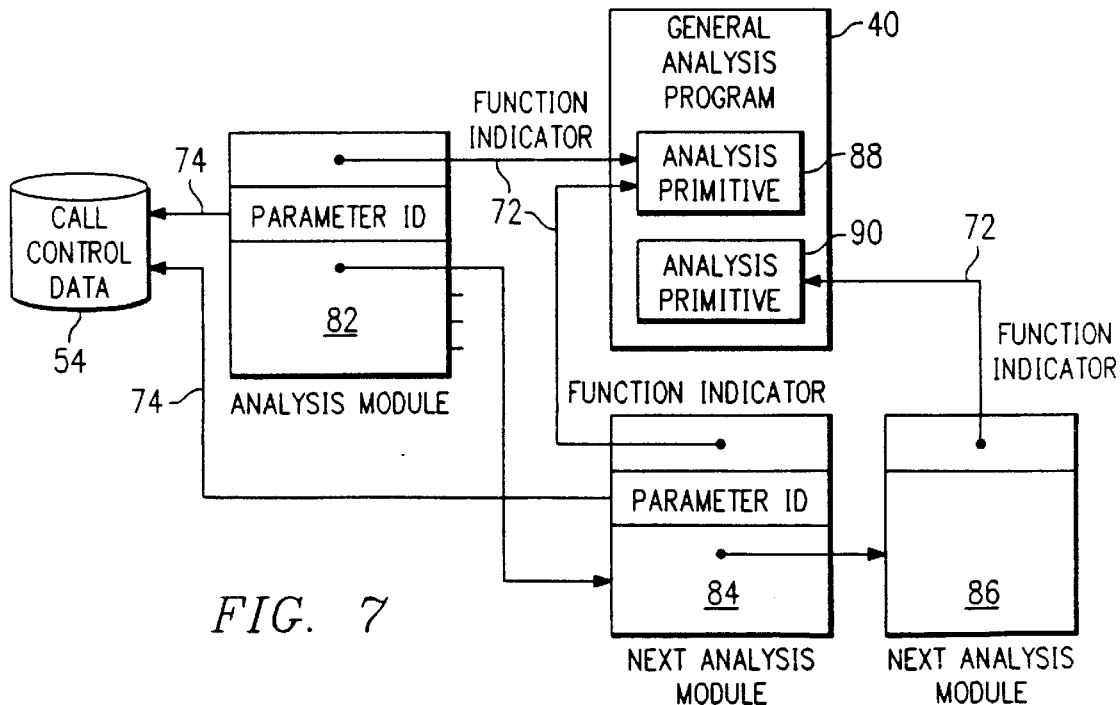
FIG. 7 is a pictorial representation of the interaction between and among the general analysis program, the analysis control data and the call control data in an exemplary analysis performed by the general analysis system of the present invention.

Referring next to FIG. 7, a pictorial representation of the interaction between and among the general analysis program 40, the analysis control data 42 and the call control data 54 in an exemplary analysis performed by the general analysis system of the present invention may now be seen. In FIG. 7, three exemplary analysis modules 70 in the analysis control data 42 (not shown) are, for clarity and convenience, separately numbered as analysis modules 82, 84, 86, and two exemplary analysis primitives 78 in the general analysis program 40 are also, for clarity and convenience, separately numbered as analysis primitives 88, 90. For the sake of simplicity, the analysis primitive 88 is assumed to be of the type "selector" which selects an outlet, i.e., a module indicator 80, from the referencing analysis module 70 to the next analysis module 70 based on the parameter value being analyzed by the referencing analysis module 70. The analysis primitive 90, on the other hand, is a result generating analysis primitive which writes the value of an intermediate or final result into the call control data 54.

At the beginning of the exemplary analysis, the general analysis program 40 interprets analysis module 82 to identify the function (analysis primitive 78) to be executed. Because the function indicator 72 in the analysis module 82 points to the analysis primitive 88, the general analysis program 40 executes the analysis primitive 88 which, in turn, uses the parameter value identified by the parameter ID 74 in the analysis module 82 to select analysis module 84 as the next analysis module 70 in the exemplary analysis. At this point, the general analysis program 40 interprets analysis module 84 and again executes analysis primitive 88 which is indicated by the function indicator 72 in the analysis module 84. Based on the parameter value identified by the parameter ID 74 in the analysis module 84, the analysis module 86 is selected as the next analysis module 70 in the exemplary analysis. The exemplary analysis proceeds along these lines and an intermediate result or a final result may ultimately be generated and written into the call control data 54 by the result generating analysis primitive 90 when the analysis passes through, for example, the analysis module 86.

Figure 8:
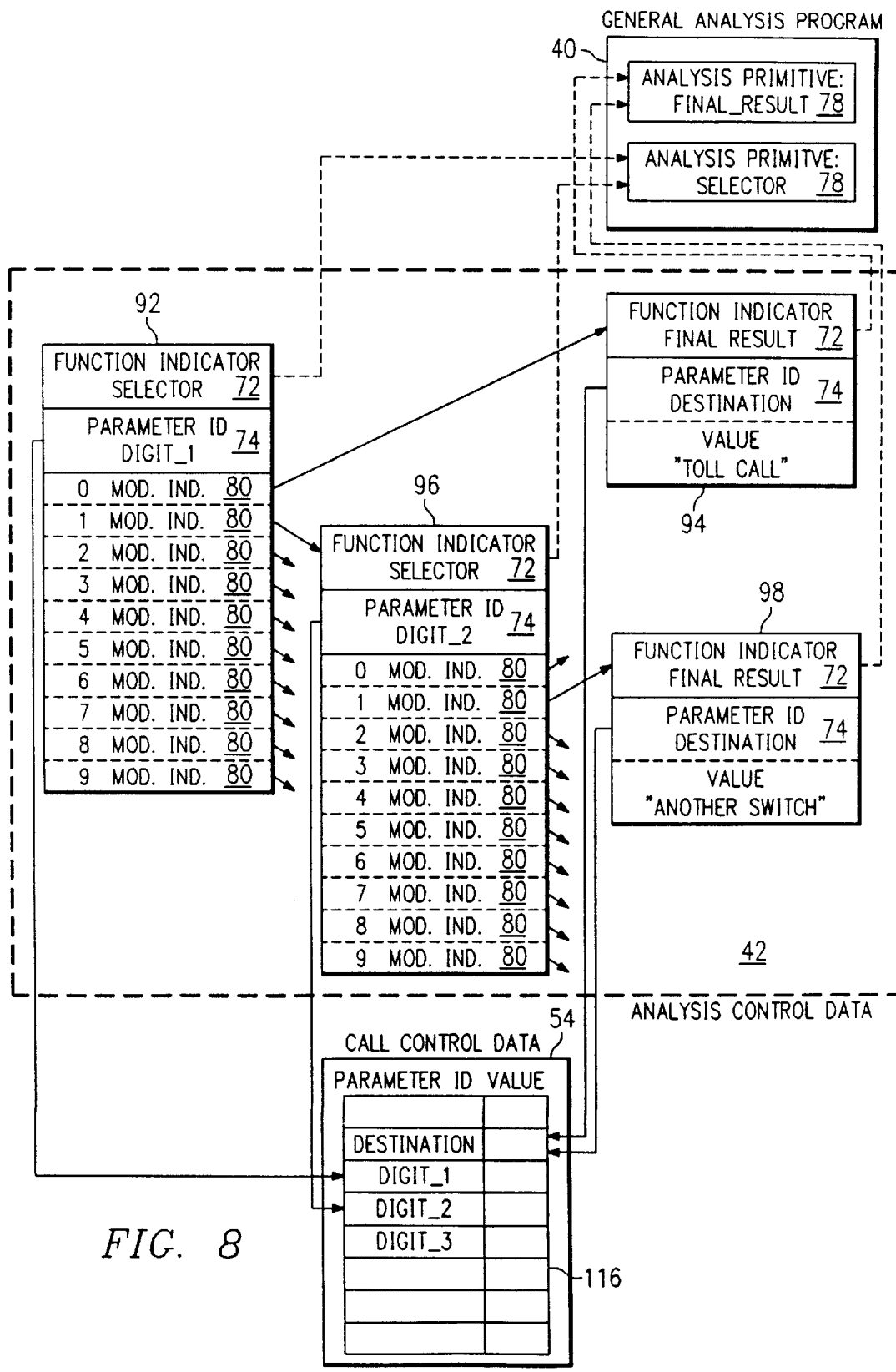
FIG. 8 is a pictorial illustration of the construction of a destination analysis from a chain of analysis modules of the form shown in FIGS. 5–7.

Referring next to FIG. 8, a pictorial illustration of the construction of a destination analysis from a chain of control-level analysis modules of the form generally shown in FIGS. 5–7 may now be seen. FIG. 8 shows a species of the exemplary analysis shown more generally in FIG. 7. In FIG. 8, only four exemplary control-level analysis modules 70 are shown and, for clarity, are separately numbered as analysis modules 92, 94, 96, 98. The control-level analysis modules 92 and 96 are of one type while the control-level analysis modules 94 and 98 are of another type. More specifically, the function indicator 72 in each of the control-level analysis modules 92 and 96 references one type of high-level analysis primitives 78 called "Selector" while the function indicator 72 in each of the control-level analysis modules 94 and 98 references another type of high-level analysis primitives 78 called "Final Result" (both Selector and Final Result, however, could be high-level analysis modules 70 instead of high-level analysis primitives 78). The function of the Selector analysis primitive 78 is to select one of the module indicators 80 from the control field 60 of the referencing control-level analysis module 70 based on the value of the parameter indicated by the parameter ID 74 in the referencing control-level analysis module 70. The function of the Final Result analysis primitive 78, on the other hand, is to assign a predetermined value from the control field 60 of the referencing control-level analysis module 70 to the parameter indicated by the parameter ID 74 in the referencing control-level analysis module 70.

As mentioned, the format of the control field 60 in any control-level analysis module 70 depends on the type of high-level analysis primitive 78 (or high-level analysis module 70) referenced by the function indicator 72. In the case of the Selector type control-level analysis modules 92 and 96, the control field 60 includes a parameter ID 74 and a plurality of module indicators 80 which point to several other control-level analysis modules 70 which are candidates to be the next analysis module 70 in the analysis chain. Depending on the value of the parameter indicated by the parameter ID 74 in each of the control-level analysis modules 92 and 96, a different analysis module 70 may be selected as the next analysis module 70 in the analysis chain each time the control-level analysis module 92 or 96, respectively, is executed.

The control field 60 in each of the Final Result type control-level analysis modules 94 and 98, on the other hand, includes a parameter ID 74 and a predetermined value which will be written into the location for the parameter indicated by the parameter ID 74 when the corresponding control-level analysis module 94 or 98 is executed. The result generating analysis modules 94 and 98 in FIG. 8 are used to generate final results, i.e., their function indicators 72 reference the Final Result type analysis primitive 78, and thus constitute ending points in the analysis. Examples of analysis primitives 78 which generate intermediate results may be found in Appendix A hereto. The analysis modules which are used to generate intermediate results are similar in structure to the analysis modules 94 and 98 except that they require a module indicator 80 to a next analysis module 70 since they are not ending points in the analysis.

In FIG. 8, the control-level analysis modules 92, 94, 96, 98 are used for performing destination analysis of a call, e.g, the digits of a telephone number dialed by the A-subscriber using the telephone unit 10. Some of the relevant parameters in the call record 116 for the call being analyzed are shown in FIG. 8. For purposes of the exemplary destination analysis in FIG. 8, only four parameters are shown to be stored in the call record 116 although, in practice, many other parameters may be stored in the call record 116. The four exemplary call parameters are given the external names "Destination," "Digit 1," "Digit 2" and "Digit 3" which are compiled into corresponding parameter IDs 74 (pointers). The parameter "Destination" refers to the final result 48 of destination analysis. The location of this parameter in the call record 116 receives its value at the end of destination analysis. The parameters "Digit 1," "Digit 2" and "Digit 3" refer to the first, second and third dialed digits, respectively, in the subscriber input 58. The locations of these parameters in the call record 116 receive their values at the beginning of the call.

With continuing reference to FIG. 8, the analysis module 92 controls the analysis of the first dialed digit which is identified by the name "Digit 1" and there are, then, a total of ten possible outlets from the analysis module 92 corresponding to the ten possible first digit values (0–9). Execution of the analysis module 92 results in the execution of the Selector analysis primitive 78 indicated by the function indicator 72 in the analysis module 92. If, for example, Digit 1 is zero (0), indicating a toll call, the analysis module 94 will be selected as the next analysis module 70 in the destination analysis. The analysis module 94 contains the parameter ID 74 "Destination" which identifies the location in the call record 116 where the result "toll call" should be written. Execution of the analysis module 94 leads to the execution of the Final Result analysis primitive 78 which assigns the value "toll call" to the parameter "Destination" (the name "toll call" will be compiled into some constant value which is written into the location corresponding to the parameter ID "Destination"). In this case, the switch need not perform any further destination analysis of the second, third, etc., dialed digits but may simply connect the call to an appropriate toll switch in the network hierarchy.

On the other hand, if the first dialed digit is one (1), the analysis module 96 will be selected as the next analysis module 70 in the destination analysis. The analysis module 96 is of the same type as analysis module 92 but controls the analysis of the second dialed digit which is identified by the name "Digit 2." Execution of the analysis module 96 similarly results in the execution of the Selector analysis primitive 78 indicated by the function indicator 72 in the analysis module 96. If the second dialed digit is also 1, indicating a call to a B-subscriber served by another switch in the same directory area assigned by the numbering plan, the analysis module 98 will be selected as the next analysis module 70 in the destination analysis. The analysis module 98 is of the same type as analysis module 94 but contains the result "another switch" (instead of "toll call") for what should be written in the location corresponding to the parameter ID 74 "Destination" in the call record 116. Execution of the analysis module 98 leads to the execution of the Final Result analysis primitive 78 which assigns the value "another switch" to the parameter "Destination." In this case, the switch need not perform any further destination analysis of the third, fourth, etc., dialed digits but may simply connect the call to the other switch which serves the called B-subscriber.

FIG. 8 shows the progression of destination analysis for two cases only, i.e., where the first dialed digit is 0 or where the first and second dialed digits are both 1. If "Digit 1" has the value 0, the parameter "Destination" will, after the destination analysis has run its course, have the value "toll call." If, on the other hand, both "Digit 1" and "Digit 2" have the value 1, the value of the "Destination" call parameter will be "another switch" after execution of the destination analysis. For the sake of simplicity, the analysis of other values of "Digit 1" and "Digit 2" (or, for that matter, the analysis of the remaining digits, e.g., "Digit 3") are not shown in FIG. 8 but should be considered to proceed along similar lines. For example, if "Digit 1" is neither 0 nor 1, indicating a call to a B-subscriber served by this switch, one of the module indicators 80 corresponding to one of the digit values 2–9 would be selected and the indicated next analysis module 70 will be executed. The destination analysis will continue until one or more of the remaining dialed digits have been analyzed and a final result 48 written into the "Destination" parameter location. The switch will eventually connect the call directly to the called subscriber or, perhaps, to a PBX to which the called subscriber is connected.

It may thus be seen that the analysis performed by the general analysis system of the present invention may be represented as a tree structure consisting of a plurality of analysis modules 70 (nodes) which are interconnected by pointers (branches) derived from their control fields 60. The contents of a particular control field 60, and the manner in which the next module indicator 80 (if any) is derived from it, depend on the type of high-level analysis primitive 78 indicated by the function indicator 72. For the control-level analysis modules 70 shown in FIGS. 5–8, the control field 60 includes a single parameter ID 74. Other control-level analysis modules 70, however, may use several call parameter values, i.e., may contain several parameter IDs 74, or alternatively, may not use any call parameter values at all. In other words, while each control-level analysis module 70 in the analysis control data 42 contains a function indicator 72, the parameter ID 74 is an optional feature. In fact, the contents of the entire control field 60 are optional in nature and depend on the type of high-level analysis primitive 78 which is used to interpret it. Stated differently, the code for each type of high-level analysis primitives 78 interprets a certain corresponding structure of the control-level analysis modules 70.

Types of High-Level Analysis Primitives

The high-level analysis primitives 78 which may be used as fundamental elements in different analyses, i.e., called upon to interpret control-level analysis modules 70, may be of several different types, some of which may perform a similar function, e.g., selection, result generation, etc. The high-level analysis primitives 78 may be "selectors" which use one (or more) of the values of the parameters 46 to select one of several possible outlets, i.e., a module indicator 80, in a control-level analysis module 70 and thereby direct the analysis to the next analysis module 70 indicated by the selected module indicator 80. One type of selector may use one of the parameters 46 as an index to a table of outlets in the control field 60 of an analysis module 70 (the "Selector" analysis primitive 78 discussed in connection with FIG. 8, for example) while another type of selector may compare or match the value of the parameter 46 with a number of values in the control field 60 and select an outlet based on this comparison, which may be a string, boolean, bit-wise or an arithmetical comparison. Other selectors may be distributors which distribute between outlets in accordance with, for example, a circular, stochastic or percentile distribution.

Other types of high-level analysis primitives 78 may be assigned the task of result generation, i.e., the delivery of output data from the execution of an analysis module 70 to the call control data 54 (the "Final Result" analysis primitive 78 discussed in connection with FIG. 8, for example), or the task of analysis control, i.e., control of the analysis sequence including, for example, calling on a group or subgroup of analysis modules 70 and returning when the analysis of the group or subgroup has been completed. The high-level analysis primitives 78 may further include certain analysis primitive functions which, unlike the analysis control primitives, e.g., selectors, do not influence the choice of path or route through the analysis but instead perform a particular function such as, for example, the registration of statistics, the reporting of results, the modification of parameter values or the transmission of signals to other switches in the network.

Many of the high-level analysis primitive functions 78 mentioned above are further discussed in Appendix A hereto. A discussion of the index selector analysis primitive 78, in particular, may also be found in the description of the preferred embodiment which follows. It will be appreciated by those of ordinary skill in the art that the types of high-level analysis primitives 78 discussed herein are merely exemplary and not exhaustive of the numerous possible types which may be used in the present invention. It will be further appreciated from the ensuing description of the preferred embodiment of the present invention that the functions described in Appendix A may be implemented in high-level analysis modules 70 which reside in the analysis control data 42 instead of high-level analysis primitives 78 which reside in the general analysis program 40.

Types of Control-level Analysis Modules

Figure 9A:
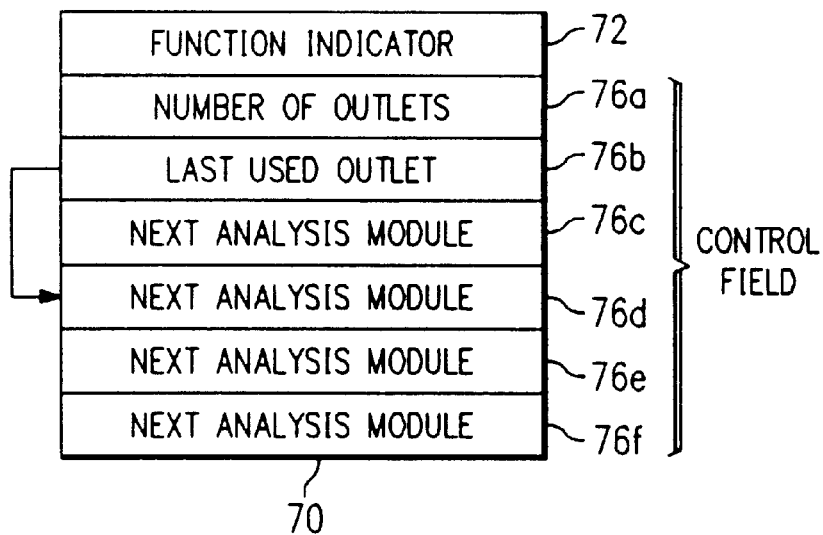
FIGS. 9A–B are schematic illustrations of two exemplary uses of the control data in the control field of an analysis module.
Figure 9B:
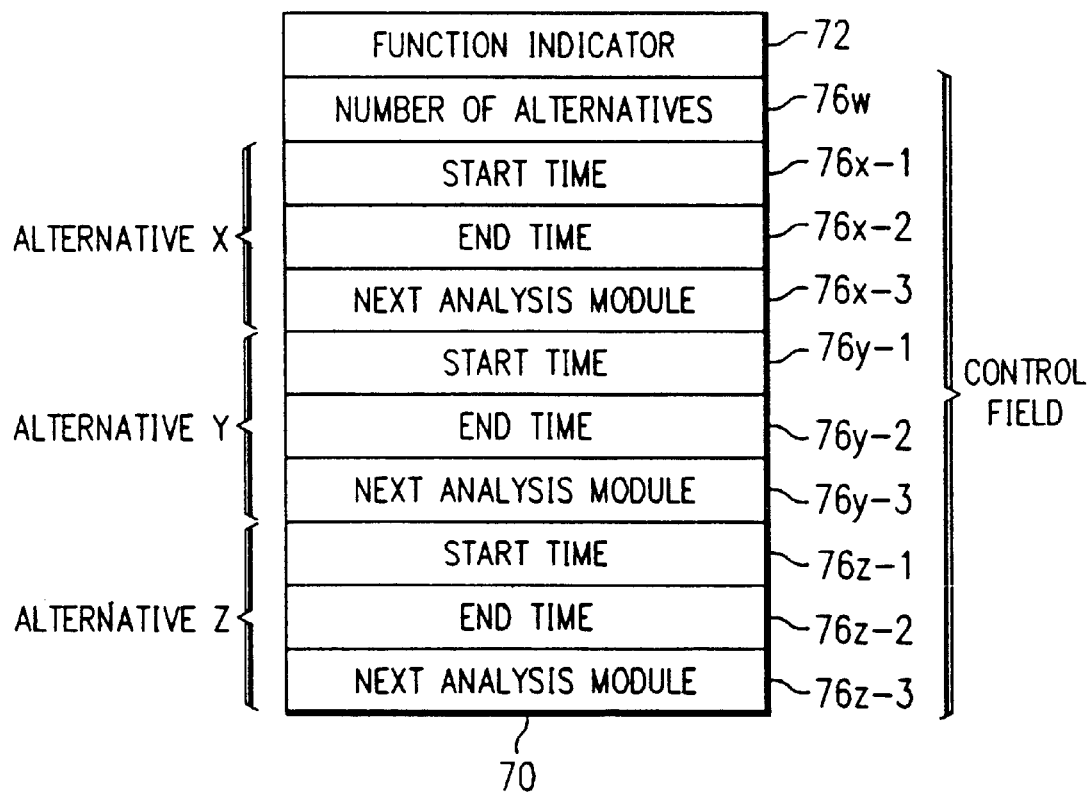

Like the high-level analysis primitives 78 (or the high-level analysis modules 70) which interpret them, the control-level analysis modules 70 may be of several corresponding types. For example, in the case of a control-level analysis module 70 whose function indicator 72 references an index selector analysis primitive 78, the control data 76 may be arranged as a table of module indicators 80 and the index selector 78 may use the value of a parameter 46 to index the table and to select the corresponding module indicator 80 as a pointer to the next analysis module 70 to be executed (see FIG. 13). As shown in FIGS. 9A–B, however, the control field 60 may include other useful information in addition to the module indicators 80.

Referring next to FIGS. 9A–B, schematic illustrations of two exemplary uses of the control data 76 in the control field 60 of an analysis module may now be seen. FIG. 9A illustrates the arrangement of the contents of the control field 60 of an analysis module 70 in the case where the function indicator 72 points to a circular distribution selector analysis primitive 78 which, in contrast to the index selector 78, does not use a parameter 46 to select one of a plurality of module indicators 80, but instead cyclically selects between and among the module indicators 80 in the control field 60. The control field 60 shown in FIG. 9A comprises a plurality of subfields or slots 76a–f which store other control data in addition to the next module indicators 80. In the circular distribution example shown in FIG. 9A, slot 76a contains a designation of the number of possible outlets, i.e., next analysis modules 70, and slot 76b contains a reference to the last used outlet from the analysis module 70, i.e., the next analysis module 70 selected the last time the analysis path crossed the analysis module 70 shown in FIG. 9A, while each of the slots 76c–f contains a module indicator 80 which references one of the possible outlets from the analysis module 70. In this specific example, there are four possible outlets and the last used outlet was to the analysis module 70 indicated by the module indicator 80 in slot 76*d*.

When the analysis passes through the analysis module 70 shown in FIG. 9A, the circular distributor 78 will select the module indicator 80 which sequentially follows the last used module indicator 80 in the circular distribution and will modify the reference to the last used outlet in slot 76*b* to point to the selected module indicator 80. In one implementation, the reference in slot 76*b* may simply be the value of a counter which is stepped or incremented every time the analysis passes through the analysis module 70 shown in FIG. 9A. The value stored in slot 76*a* will then represent an upper limit on the value of the counter which is reset to a lower limit whenever this upper limit is surpassed so as to cycle the count. In the example shown in FIG. 9A, the circular distributor 78 will select the module indicator 80 in slot 76*e* and update the reference in slot 76*b* to point to slot 76*e*. As may be seen, the selection of an outlet, i.e., a next analysis module 70, by the circular distributor 78 is not made with reference to a parameter 46 but is dependent on the value of the counter in the last used outlet slot 76*b*.

FIG. 9B illustrates another use of the control data 76 in the control field 60. In particular, FIG. 9B illustrates the arrangement of the contents of the control field 60 in the case where the function indicator 72 points to a time-dependent selector analysis primitive 78 which selects a module indicator 80 in the control field 60 based on the time of day at the moment the analysis passes through the analysis module 70 shown in FIG. 9B. In this manner, a certain routing pattern may be selected for calls processed during a certain part of the day and a different routing pattern selected for calls processed during a different part of the day. For example, calls made to a telephone customer during normal business hours may receive normal call treatment while calls made after the close of business may instead be automatically routed to a voice mail system or to an answering service. The exemplary analysis module 70 shown in FIG. 9B may be used to achieve the desired time differentiation in the routing analysis performed during call processing.

With continuing reference to FIG. 9B, the control field 60 includes a subfield 76*w* which designates the number of alternatives or paths which may be selected by the time-dependent selector 78. For purposes of illustration, three alternatives, X, Y and Z, are shown in FIG. 9B. Each alternative consists of three slots which contain a start time data, an end time data and a reference to the next analysis module 70, i.e., a module indicator 80, associated with the alternative, respectively. The start time and end time data define the time interval during which the time-dependent selector 78 will select the next analysis module associated with the alternative. For example, the start time data in slot 76*x*-1 and the end time data in slot 76*x*-2 define the time interval during which the module indicator 80 in slot 76*x*-3 will be selected. Similarly, the start time data in slot 76*y*-1 and the end time data in slot 76*y*-2 define the time interval during which the module indicator 80 in slot 76*y*-3 will be selected, and the start time data in slot 76*z*-1 and the end time data in slot 76*z*-2 define the time interval during which the module indicator 80 in slot 76*z*-3 will be selected. Thus, when the analysis passes through the analysis module 70 shown in FIG. 9B, the time-dependent selector 78 will compare the time of day with the time intervals defined in alternatives X, Y and Z and will select the path indicated by the module indicator 80 associated with the alternative in whose time interval the time of day happens to fall.

FIGS. 9A–B, therefore, show two examples of control-level analysis modules 70 which contain no parameter IDs 74, i.e., which reference certain types of high-level analysis primitives 78 (or, equivalently, high-level analysis modules 70) which do not use any parameters at all in interpreting the particular control data 76 in the referencing control-level analysis modules 70. In this aspect, the control-level analysis modules 70 shown in FIGS. 9A–B may be regarded as entirely "self-contained," i.e., they contain all the information required by the referenced high-level analysis primitives 78 (or the referenced high-level analysis modules 70). The control-level analysis modules 70 in FIGS. 5–8, on the other hand, reference different types of high-level analysis primitives 78 (or high-level analysis modules 70) which individually require the use of a single parameter value. Some examples of control-level analysis modules 70 which individually use several call parameter values, and therefore require several parameter IDs 74, may be gleaned from the discussion, in Appendix A hereto, of the particular high-level analysis primitive functions 78 (or, equivalently, high-level analysis modules 70) which interpret them. These examples, of course, are for illustration purposes and do not span the entire range of possible control-level analysis modules 70 which may be used in the present invention.

Types of Low-Level Analysis Primitives

The low-level analysis primitives 78 consist generally of primitive operations, e.g., add, fetch, etc., which are used as basic building blocks in more sophisticated operations. Unlike the high-level analysis primitives 78, the low-level analysis primitives 78 are not used directly to construct an analysis, but are used instead to recursively construct new low-level analysis modules 70 in the analysis control data 42. The new low-level analysis modules 70 are essentially permutations or combinations of the low-level analysis primitives 78, which may be similarly used to recursively construct in the analysis control data 42 new high-level analysis modules 70 which are equivalent in function to the high-level analysis primitives 78 in the general analysis program 40. The new high-level analysis modules 70, which may be constructed from the new low-level analysis modules 70, may, in turn, be used together with the high-level analysis primitives 78 to instansiate (build) new control-level analysis modules 70 for controlling a particular analysis, e.g., a control-level analysis module 70 which analyzes the third digit in a telephone number in routing analysis. The function indicator 72 in each of these new control-level analysis modules 70 will then reference the high-level analysis primitive function 78 or the high-level analysis module 70 from which that control-level analysis module 70 was instansiated.

In Appendix C hereto, a set of low-level analysis primitive functions 78 is briefly described. This set, however, is not exhaustive but is intended to exemplify the type of low-level analysis primitive functions 78 which may be used within the preferred embodiment of the present invention, i.e. the application of the general analysis system for the control of call processing in a telecommunications system or, more specifically, an exchange in a central office. As will be appreciated by persons of ordinary skill in the art, several other low-level analysis primitive functions 78 may be implemented in the general analysis system of the present invention, whether for the exemplary telephony application or any other application.

Types of Analyses

The types of analyses which may be performed by the general analysis system of the present invention vary with the needs of different applications. The preferred embodiment of the present invention described below is primarily applicable to call processing in a tele-communications system (e.g., a toll or local exchange, a packet switch, etc.) and, therefore, performs such analyses as digit analysis and routing analysis, among other related analyses. In Appendix B hereto, a simplified analysis example is described for a local exchange in a hypothetical telephone network. This example uses many of the high-level analysis primitive functions 78 (or, equivalently, the high-level analysis modules 70) which are described in Appendix A and which may be constructed from the low-level analysis primitive functions 78 described in Appendix C. It will be appreciated that, while the types of analyses (and the types of analysis primitives 78 and analysis modules 70 which make up each analysis) described in Appendix B are somewhat specific to the telephony application, the present invention may be used to perform completely different types of analyses in other applications.

The Preferred Embodiment

Having described the overall structure and operation of the general analysis system of the present invention, the remaining discussion will concentrate on a certain preferred embodiment which represents but one of the myriad of possible implementations, variations and design alternatives. While many techniques for implementing the concepts of the general analysis system of the present invention may occur to those of ordinary skill in the art after a reading of the foregoing discussion, the threaded interpretative language (TIL) technique and, in particular, the Forth programming language will be used hereinafter to illustrate some of the concepts underlying the preferred implementation of the general analysis system. Hence, before turning to the preferred embodiment, a brief description of threaded-code systems will help lay the foundation for some of the concepts which are introduced below. Further background on the subject of threaded-code systems may be found in Kogge, Peter M., "An Architectural Trail to Threaded-Code Systems," *Computer*, March 1982, pp. 22–32. Additional clarification may be obtained from a reading of the description of the low-level analysis primitives set forth in Appendix C hereto.

Threaded Interpretative Languages

Computer languages, in general, are intended to bridge the gap between the primitive operations which the computer is designed to perform, e.g., add, fetch from memory, etc., and the tasks which the user needs to accomplish, e.g., invert a matrix, search a file, etc. Because different users in different applications have different needs, it is virtually impossible for a nonextensible language to equally satisfy all of these needs. One approach to this dilemma may be to attempt to include in the language all possibly useful operations, structures and facilities. This approach, however, is cumbersome and closed-ended. Threaded interpretative languages take a different and open-ended approach. Their approach is to provide a few techniques which allow the user to quickly add the special operations which are required in his particular application. The ability to add language facilities and compiler structures is called "extensibility." This extensibility may occur on at least two levels of increasing power, i.e., the ability to add language facilities using existing compilers and the ability to create new application-specific compilers which, in turn, may be used to add more useful language facilities. See, for example, Harris, Kim, "Forth Extensibility: Or How to Write a Compiler in Twenty-Five Words or Less," *Byte*, August 1980, pp.164–196.

Generally speaking, a computer program written in a threaded interpretive language (TIL), e.g., Forth or Postscript, is represented in the computer as a list of addresses of subroutines, each of which is composed of addresses of other subroutines, and so on until the primitive operations of the language are reached. Because it has little to do except read addresses and jump to them, a threaded language interpreter can run very fast. Several types of address interpreters are used in threaded-code systems. In a direct threaded-code system, a sequence of subroutines is threaded into a list of their entry addresses. More specifically, the nested subroutine calls in each subroutine at the next-to-lowest subroutine nesting level (where each called subroutine is not, in turn, calling any other subroutines) in a computer program written in a conventional high-level programming language, e.g., ADA or PASCAL, may be represented with a simple list of addresses. A small machine-language routine (known as an interpreter) goes through this list sequentially making indirect branches at each step. An interpreter register points to the next address in the list of procedures to be executed, i.e., points to the address of the actual machine code for the next procedure. A variation to this technique adds a level of indirection to the address interpreter. In an indirect threaded-code system, the interpreter register does not directly point to the address of the next procedure, but points instead to the address of a pointer to the next procedure. Yet one more level of indirection may be added to the address interpreter. In an indirect token-threaded code system, the interpreter register points to the address of a token which serves as an index to a table of possible pointers to the next procedure.

A TIL application is defined in terms of a set of application-specific words (or objects) which reside in a dictionary in the TIL system. Each "word" in the TIL dictionary designates an executable procedure (not simply a piece or byte of memory) which may be given an external alphanumeric name. The internal TIL dictionary entry for each word generally consists of a name field which contains the compiled name of the word, a code field which contains a reference to the instructions to be executed when the word is executed, and a parameter field which contains the compiled definition of the word, e.g., a series of references to other words in the definition. The TIL dictionary contains a first set of built-in words which are basic to most user applications and a second set of built-in words which allow the user to create new application-specific words to be added to the dictionary. Once defined in the TIL dictionary, a word may be used to define many other application-specific words. The TIL dictionary is, therefore, extensible.

The process of entering new words into the TIL dictionary is usually referred to as the compilation state. In the compilation state, the TIL system reads definitions of new application-specific words input from some external source, e.g., a mass storage device or a video terminal. The definition of each new word consists of a defining word followed by the name of the word being defined and, then, by the definition body for the new word, e.g., other words and numbers. The defining word is a built-in or a user-defined (application-specific) word which causes the TIL system to enter the compilation state to compile the definition body and to add an entry for the word being defined in the TIL dictionary (the entry will contain the compiled definition). Some examples of built-in defining words in the Forth language are ":" (colon), CONSTANT and VARIABLE. Examples of other built-in Forth words include ";" (semicolon) which ends the definition of a new word defined by (:). An example of a defining word in the preferred embodiment of the present invention is PROC. Other words used in the preferred embodiment include ENDPROC which ends the definition of a new word defined by PROC.

The definition of a defining word is different from those of other words in that it includes both a BUILD (compile) part, which is executed when words are compiled by the defining word, and a DO (interpret) part, which is executed when the words compiled by the defining word are executed. The function of the BUILD part (which is executed in the compilation state) is to compile the definition of a new word into the TIL dictionary. The compilation generally entails writing the name of the new word into the name field, and writing a reference to the DO part into the code field, of the dictionary entry for the new word. The BUILD part of the defining word will also compile the definition body of the new word into the parameter field of the corresponding dictionary entry in such a way that the DO part can interpret the parameter field whenever the new word is executed.

For example, when a new word is compiled with the defining word (:) in the Forth programming language, or the defining word PROC in the preferred implementation of the general analysis system of the present invention, the definition body of the new word will generally consist of a sequence of built-in or user-defined (application-specific) words which are looked up one by one in the TIL dictionary and, for each word looked up, the address of the corresponding dictionary entry is written into the parameter field of the dictionary entry for the new word being compiled. When the new word is executed, the interpreter in the DO-part of (:) or PROC simply reads those addresses and executes the referenced words. For definitions compiled by the defining word VARIABLE in the FORTH programming language, however, the definition body of each new word may include the size of the variable that should be allocated to the parameter field of the new dictionary entry by the BUILD part of the VARIABLE defining word. When the new word defined by VARIABLE is executed, the DO-part of the VARIABLE defining word is executed and may return the address of the variable. Hence, these defining words are actually different compilers, i.e., the defining words (:) and PROC compile procedure definitions (operators) while the defining word VARIABLE compiles data definitions (operands).

The TIL system treats user-defined words the same as system-supplied (built-in) words, i.e., all user-defined operators and operands can be used just like the system-supplied versions. Consequently, the TIL system supports at least two levels of extensibility. At the first level, the user uses standard defining words to add to the TIL dictionary new words (procedures) which are defined in terms of system supplied or user-defined words. The inclusion of a previously-compiled word in the definition of a subsequently compiled word may be considered analogous to the nesting of subroutine calls. The procedure designated by any word (whether user-defined or built-in) in the TIL dictionary is called by simply using the name of the word in the definition of a new word. At the second level of extensibility, the user creates new defining words which are, in turn, used to add (compile) new "families" (types) of words into the TIL dictionary. At this higher level, the user uses each new defining word to specify how a member of each corresponding family, i.e., a new word compiled by the new defining word, is to be compiled and executed.

The compile-time behavior and execution-time behavior of each new member of a new family of words are usually, e.g., in Forth, specified by using the special (key) words <BUILDS and DOES>, respectively, in the definition of each new defining word (the characters "<" and ">" are part of the names of these key words and indicate that <BUILDS comes before DOES> or, in other words, that the BUILD part comes before the DO part). The compile-time behavior is specified by the word <BUILD and any words following up to the word DOES>. Execution of the defining word builds a dictionary definition for a new family member. The contents of this definition are constructed by the compile-time words. The execution-time behavior is specified by the word DOES> and any words following up to the end of the definition. Executing any family member executes the execution-time words. When a new member is compiled and the new defining word is executed, the <BUILDS procedure will be executed. The <BUILDS procedure reads the name of the new member, i.e., the next word after the new defining word in the input text stream, and adds a name field and a code field for a new definition at the end of the dictionary. The name field contains the name of the new member and the code field contains a pointer to the execution-time words in the dictionary definition of the new defining word which will be executed when the new member is executed. When the new member is executed, the DOES> procedure is executed followed by the words between DOES> and the end of the new defining word definition. The DOES> procedure returns the address of the parameter field within the dictionary definition of the new member.

The principles of TIL, including the use of the <BUILDS and DOES> procedures in the Forth language, may be applied to the preferred implementation of the general analysis system. For example, some of the low-level analysis primitive functions 78 in Appendix C hereto, e.g., DUPLICATE, may be considered to correspond roughly to standard (built-in) words in TIL. Other low-level analysis primitive functions 78, e.g., PROC, may be considered to correspond roughly to built-in defining words in TIL. The high-level analysis primitive functions 78 in Appendix A hereto and the high-level analysis modules 70 may be considered to correspond roughly to more sophisticated built-in and user-defined defining words, respectively, in TIL. The control-level analysis modules 70 may be considered to correspond roughly to words in TIL which are defined from (are instances of) these more sophisticated defining words.

General Analysis System

Figure 10:
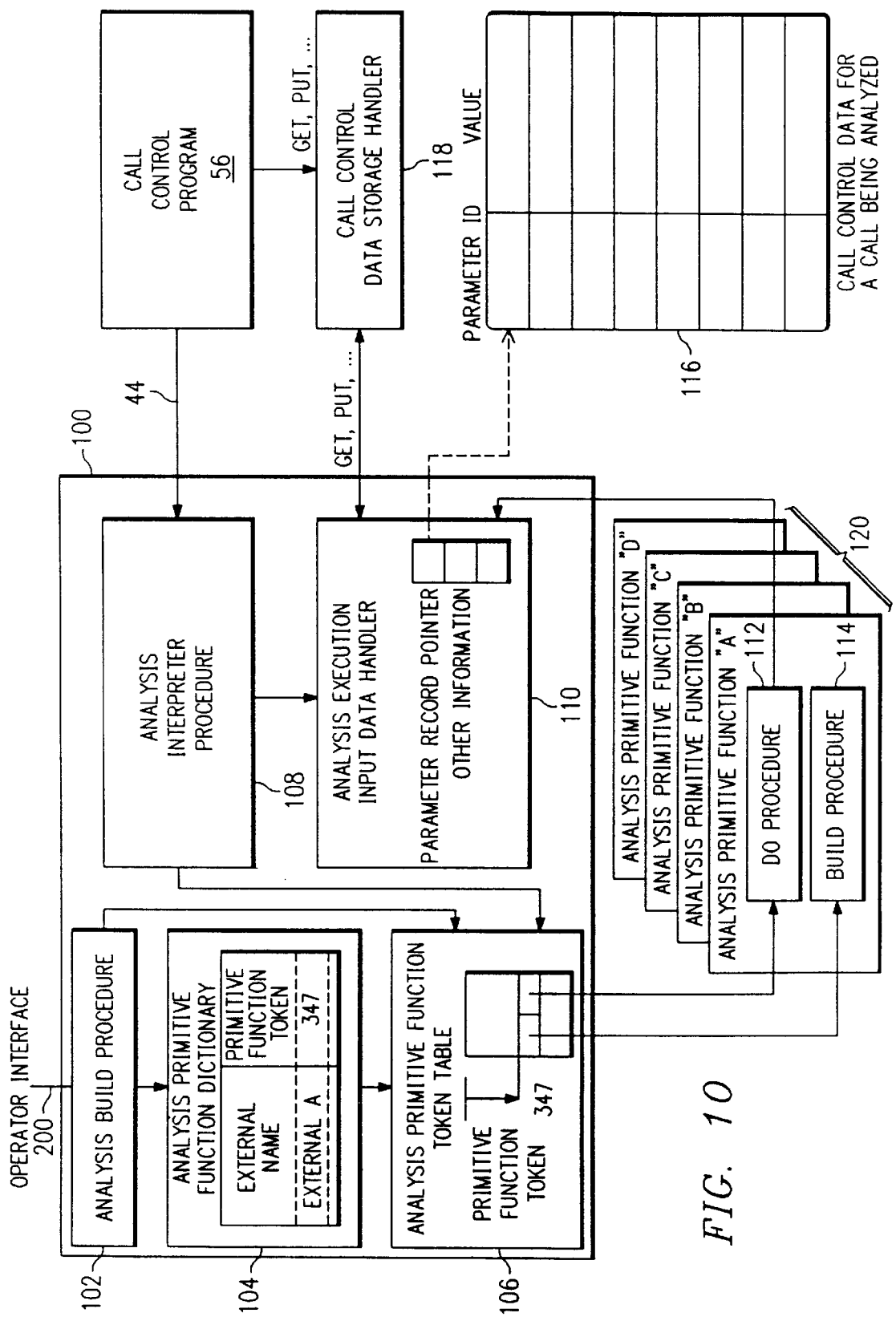
FIG. 10 is a schematic illustration of the structure of a preferred embodiment for the general analysis program of the present invention.
Figure 13:
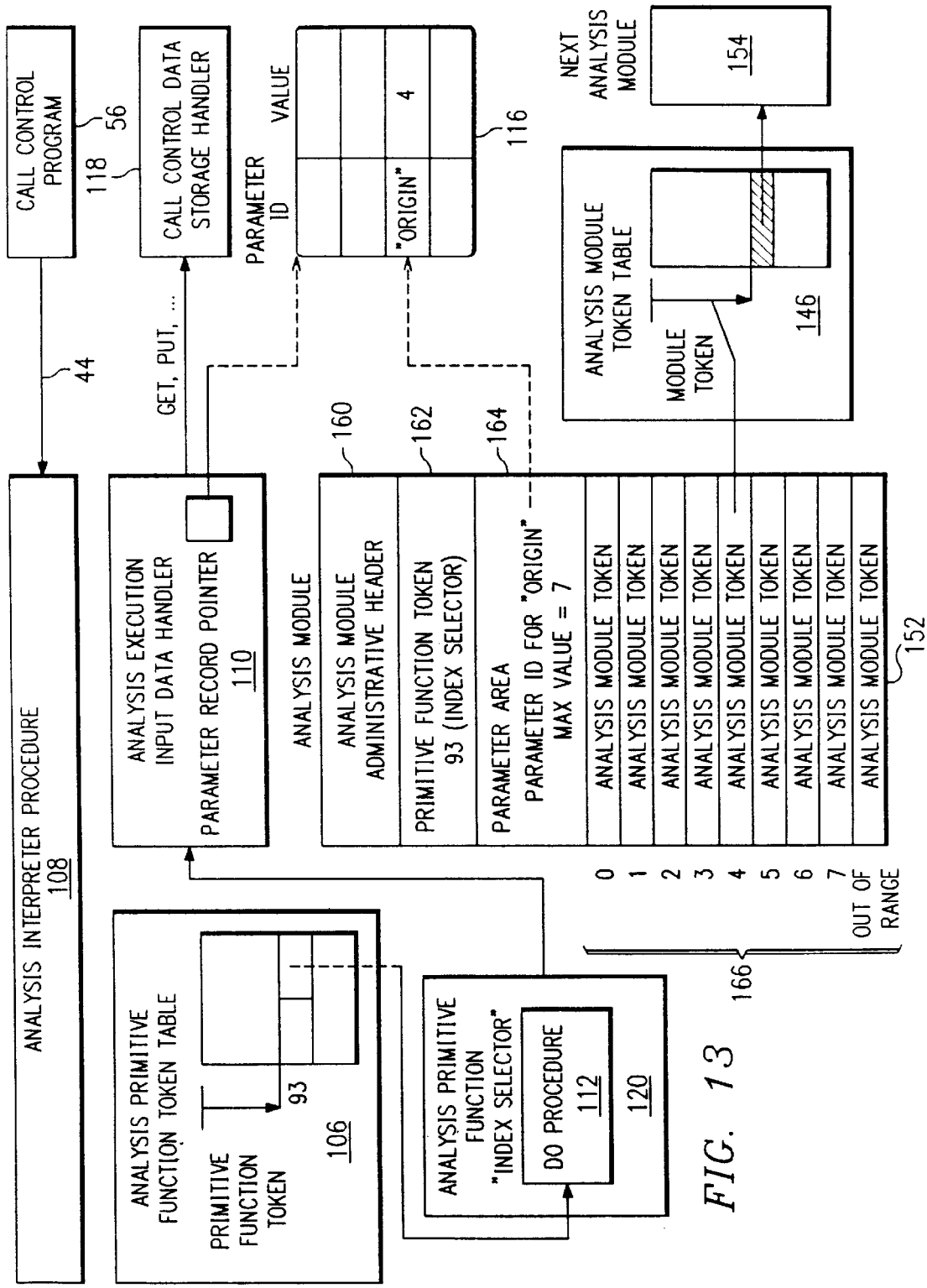
FIG. 13 is a pictorial illustration of the use of an exemplary analysis module of the type shown in FIG. 12.
Figure 14:
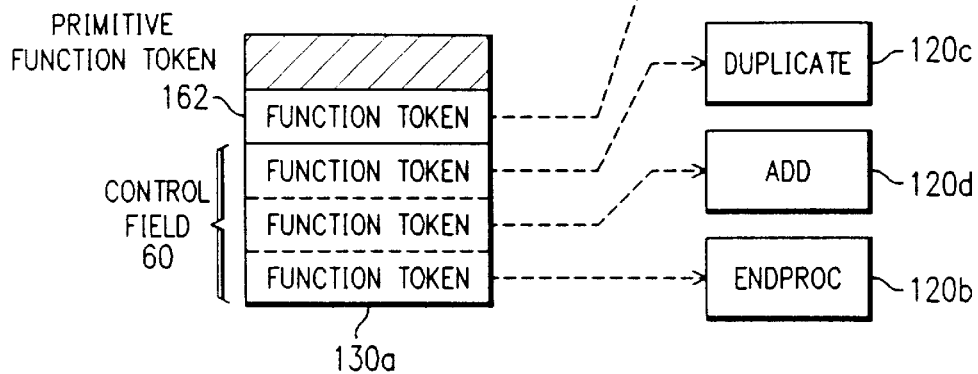
FIG. 14 is a pictorial illustration of the manner in which a low-level analysis module may be constructed from low-level analysis primitives.
Figure 16:
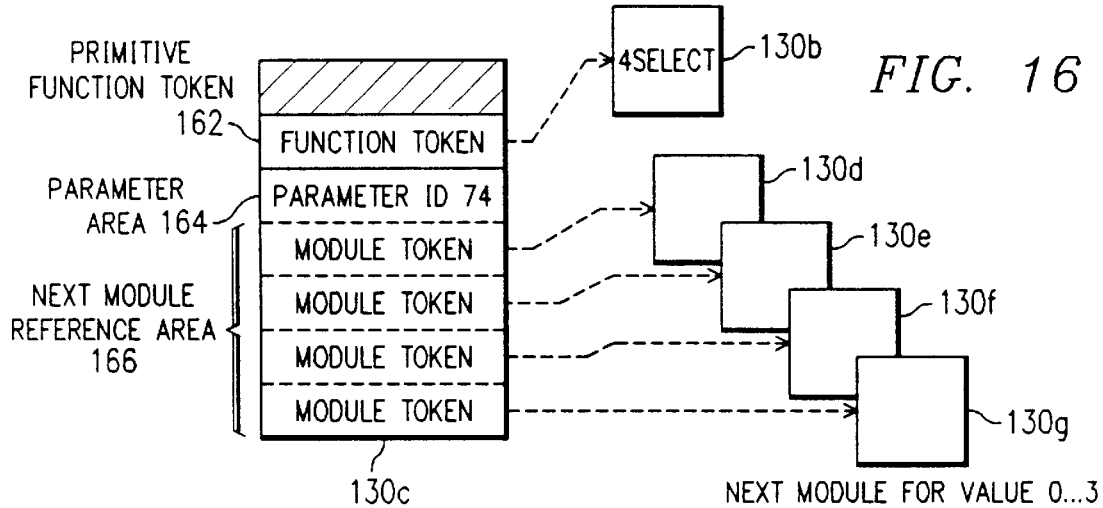
FIG. 16 is a pictorial illustration of how a control-level analysis module, similar to the exemplary analysis module shown in FIG. 12, may be instansiated with the build procedure of the high-level analysis module shown in FIG. 15.
Figure 15:
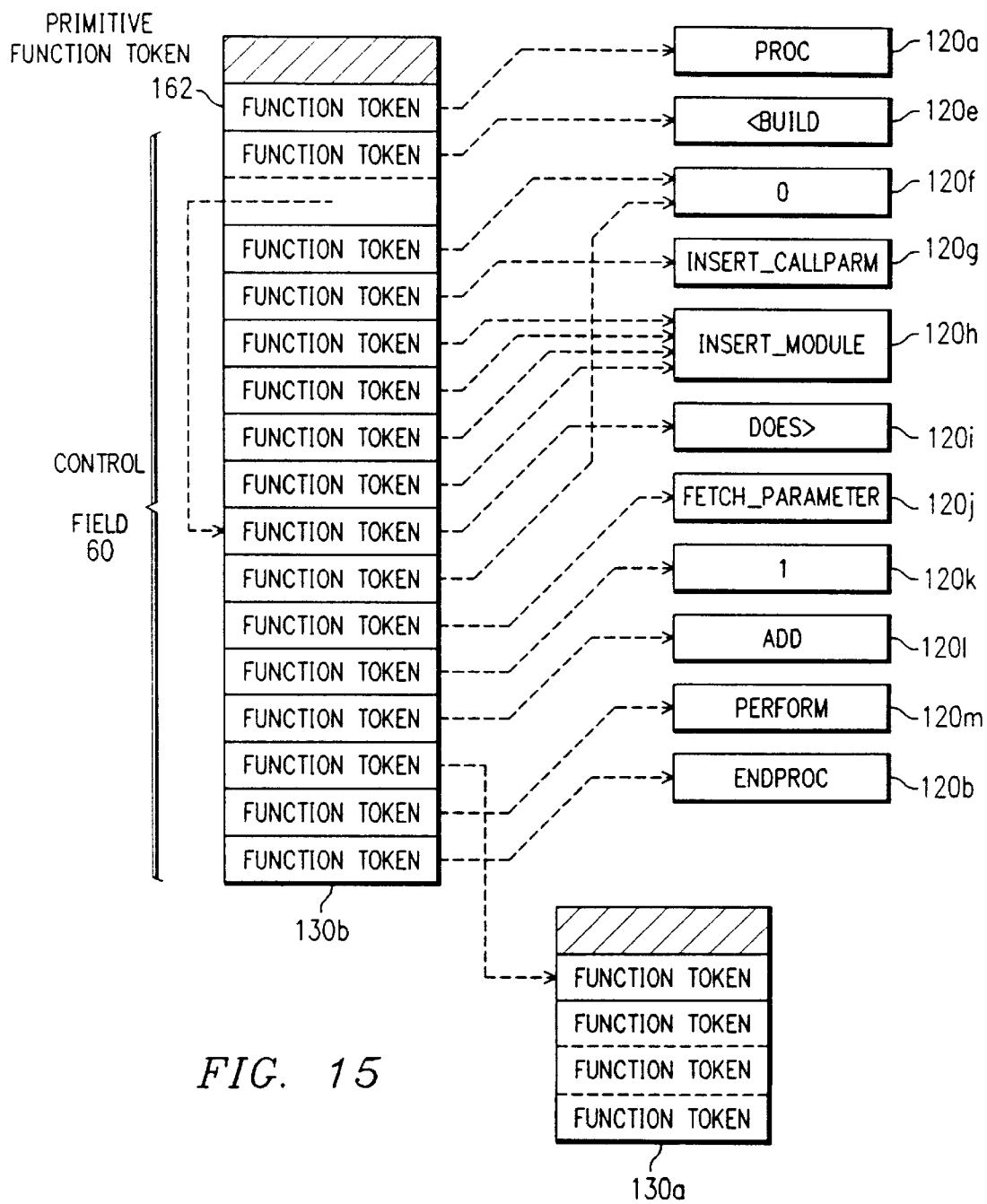
FIG. 15 is a pictorial illustration of how the user-defined low-level analysis module shown in FIG. 14 may be used in building a high-level analysis module.

Referring next to FIGS. 10–16, a series of pictorial illustrations, each depicting the structure of one or more components or elements of the preferred embodiment for the general analysis system of the present invention, may now be seen. FIG. 10 includes an illustration of the structure of the preferred embodiment for the general analysis program 40, while FIG. 11 illustrates the structure of the preferred embodiment for the analysis control data 42. FIG. 12 illustrates the structure of one type of control-level analysis modules 70 in the preferred embodiment of the analysis control data 42 shown in FIG. 11, while FIG. 13 illustrates the use of an exemplary control-level analysis module 70 of the type shown in FIG. 12. FIG. 14 illustrates the manner in which a low-level analysis module 70 may be constructed from low-level analysis primitives 78, while FIG. 15 illustrates how the user-defined low-level analysis module 70 shown in FIG. 14 may be used in building a high-level analysis module 70. FIG. 16 illustrates how a control-level analysis module 70, similar to the exemplary analysis module 70 shown in FIG. 12, may be instansiated with the build procedure of the high-level analysis module 70 shown in FIG. 15. The preferred embodiment shown in FIGS. 10–16 is based, in part, on the techniques implemented by indirect token-threaded code systems referred to above.

Referring first to FIG. 10, the general analysis program 40 is comprised of a block of generic analysis software 100 and a number of analysis primitives 78, renumbered 120 in the preferred embodiment, with the high-level analysis primitives 120 each including a do procedure 112 and a build procedure 114. As will be appreciated after a review of FIGS. 10–16 and the accompanying discussion, physically or conceptually separating the analysis primitives 120 from the software block 100 in the general analysis program 40 allows new analysis primitives 120 to be easily added in subsequent releases of the general analysis program 40 without modifying the generic analysis software 100.

For purposes of illustration, only four exemplary high-level analysis primitives 120 are shown in FIG. 10 and their functions are alphabetically labelled "A–D." It will be appreciated from the preceding discussion, however, that the analysis primitives 120 include both low-level and high-level analysis primitives and, further, that the number of high-level analysis primitive functions 120 will generally be much greater than four in practice. The software block 100 includes an analysis build procedure 102 which communicates with an operator interface 200 in accordance with, for example, the Open Systems Interconnection (OSI) model. As more fully discussed hereinafter, particularly in connection with the description of the compilation state of the present invention, the analysis build procedure 102 may be used in conjunction with the build procedure 114 of a high-level analysis primitive function 120 to instansiate (build) new control-level analysis modules 70, renumbered 130 in the preferred embodiment. As further discussed hereinafter, the build procedure 114 of a user-defined high-level analysis module 130 may be similarly used to build new control-level analysis modules 130.

Referring still to FIG. 10, an analysis primitive function dictionary 104 translates the external (symbolic) name of an analysis primitive function 120, e.g., EXTERNAL A, entered by the operator through an operator interface 200 into a primitive function token, e.g., a number (347) identifying the specific analysis primitive function 120 named EXTERNAL A. The primitive function token serves as an index into an analysis primitive function token table 106 which is used to locate one of the analysis primitive functions 120, including one of the high-level analysis primitive functions "A–D," e.g., analysis primitive function "A." The analysis primitive function token table 106 translates the value of the primitive function token, e.g., 347, into a pointer to the low-level analysis primitive function 120, or into two pointers to the high-level analysis primitive function 120, associated with this token value.

The two pointers to the high-level analysis primitive function 120, e.g., the analysis primitive function "A," consist of a first pointer to the do procedure 112 and a second pointer to the build procedure 114 of the high-level analysis primitive function 120. As explained in detail hereinafter, the do procedure 112 of a high-level analysis primitive function 120 is executed when that analysis primitive function 120 is used for performing an analysis, while the build procedure 114 of the same analysis primitive function 120 is executed when that analysis primitive function 120 is used for compiling a new control-level analysis module 130. In this respect, the analysis primitives 78 shown in FIGS. 7–8 and discussed heretofore in the general overview portion of the description correspond more precisely to the do procedures 112 of the analysis primitive functions 120 shown here in FIG. 10.

With continuing reference to FIG. 10, the software block 100 further comprises an analysis interpreter procedure 108 which interprets a tree of analysis modules 130 in response to an order to execute a particular analysis. The order to execute a particular analysis may be sent by any "analysis user," i.e., any type of program in the switch which uses (calls for the execution of) an analysis. A typical example of an analysis user is the call control program 56 which controls analog or digital traffic, e.g., telephone calls, through the switch. Other analysis users may be operation maintenance programs of different kinds. For purposes of the present discussion, however, the order to execute a certain analysis is assumed to be sent from the call control program 56.

According to the preferred embodiment, the call control program 56 sends to the analysis interpreter procedure 108 input data 44 which consists of (i) the external (symbolic) name for an analysis to be performed, e.g., "Digit Analysis" or "Routing Analysis," (ii) a parameter record pointer and, for certain analyses, (iii) other information which is context-dependent (analysis-specific). The symbolic name of the analysis is used to access the particular analysis control data for the analysis to be performed. The parameter record pointer is used to access in the call control data 54 the block of parameter values for the call to be analyzed (the call record) from which or to which the high-level analysis primitives 120 (or the high-level analysis modules 130) may then obtain or write, as needed, any call parameter values indicated by the parameter IDs 74 in the control-level analysis modules 130 for the designated analysis.

Recall that all call records contain the same set of parameters which are identified by the same set of parameter IDs 74, but that each call record contains parameter values for a particular call which may be quite different from the parameter values in another call record being analyzed at the same time. The parameter record pointer, therefore, distinguishes the particular set of call parameter values to be analyzed. The other information contained in the input data 44 may include any analysis-specific information which may also be analyzed by the high-level analysis primitives 120 (or the high-level analysis modules 130).

As shown in FIG. 10, the parameter record pointer and the other information, if any, are stored in an analysis execution input data handler 110 which interfaces with a call control data storage handler 118. The parameter record pointer points to, or references in some way, the location of a block of call control data for the call being analyzed 116 in the call control data base 54 which is stored in, or otherwise handled by, the call control data storage handler 118. The call control data block 116 includes all relevant data for the call being analyzed (each call may involve several different analyses), i.e., data input by a subscriber and other call processing results which are valid for this particular call, as well as data relating to the subscription or location of the subscriber which is valid for all calls from the subscriber.

The call control data storage handler 118 may be accessed by the analysis execution input data handler 110, acting on a request from the do procedure 112 of a high-level analysis primitive function 120 (or a high-level analysis module 130), to read (get) data from, and to write (put) data into, the call control data base 54 during an analysis, and by the call control program 56 to read and write data for other purposes. For example, the do procedure 112 of an analysis primitive function 120, e.g., analysis primitive function "A", can use the analysis execution input data handler 110 to obtain any of the parameter values in the call control data block 116. In this instance, the do procedure 112 will send a parameter request containing a parameter ID 74 to the analysis execution input data handler 110 which will, in turn, correlate or combine the received parameter ID 74 with the stored parameter record pointer into a new parameter request which is sent to the call control data storage handler 118.

As a very simple example of how to form the parameter request to the call control data storage handler 118, and without limitation on the many possible implementations familiar to those of ordinary skill in the art, the parameter record pointer may represent the first location in the block 116 and the parameter ID 74 may represent an offset from this first location which is added to the value of the parameter record pointer. The parameter value associated with the parameter ID 74 in the call control data block 116 will then be passed from the call control data storage handler 118 through the analysis execution input data handler 110 to the requesting analysis primitive function 120 and used in the analysis. Another analysis primitive function 120 may thereafter generate an intermediate or final result which is sent to the call control data storage handler 118 and stored in the call control data block 116.

It should be noted at this juncture that, for purposes of the exemplary high-level analysis primitive functions 120 described in Appendix A, the input data 44 is assumed to consist only of the external name of the analysis and the parameter record pointer, and no other information is assumed to be included in the input data 44. Consequently, none of the exemplary analysis primitive functions 120 in Appendix A make use of any other information which could be included in the input data 44. While not explicitly mentioned in Appendix A or Appendix C, it will be appreciated by those of ordinary skill in the art that the low-level analysis primitive functions 120 and the high-level analysis primitive functions 120 (or, equivalently, the high-level analysis modules 130) of the present invention may readily use other (context-specific) information which may be included in the input data 44.

For example, the low-level analysis primitives 120 may use the other information via the parameter stack, i.e., the context-specific information provided by the call control program 56 may be placed at the top of the stack as a first stack frame prior to the execution of the analysis specified in the input data 44. The analysis may then use this information through control-level analysis modules 130 defined by high-level analysis modules 130 built recursively from low-level analysis primitives 120. One use of the other information in routing analysis, for example, may be to indicate the execution of routing analysis through a secondary routing path (pattern) in the network when a primary routing path to the same desired destination is known to be congested (by virtue of a prior execution of a routing analysis through the primary path). For another example, the other information may include pointers to the call records for other calls to be analyzed similarly to the call record referenced by the parameter record pointer.

Referring next to FIG. 11, the preferred embodiment of the analysis control data 42 includes an analysis control data dictionary 132 which translates the external name of an analysis ordered by the call control program 56 into a pointer to the analysis control data for that particular analysis. Two specific examples of analysis external names, namely, "Digit Analysis" and "Routing Analysis," are shown in FIG. 11 (an external name need not be limited to a text string but, in general, may be any notation or object which is recognized externally to the general analysis system, i.e., by the operator interface 200 and the call processing software). The analysis control data dictionary 132 translates "Digit Analysis" and "Routing Analysis" and returns pointers to the corresponding analysis control data, namely, digit analysis control data 134 and routing analysis control data 136, respectively.

In the preferred embodiment, the structure of the analysis control data for any analysis, e.g., digit analysis control data 134, is similar to the structure of any other analysis, e.g., routing analysis control data 136. Each analysis control data structure, e.g., the routing analysis control data 136, is comprised of an analysis module dictionary 138 which translates the external names of analysis modules 130 into module tokens, i.e., numbers which indirectly identify the analysis modules 130 within that particular analysis control data. According to the preferred embodiment, each of the analysis modules 130 in an analysis control data structure has an external name which, for example, may begin with a prefix identifying the particular analysis followed by a number, e.g., RA275 (this format is only exemplary and an operator may choose any other suitable format, with or without a prefix). As will become clear from the discussion of the execution and compilation states of the present invention, the analysis module dictionary 138 is used in compiling (and not in executing) analysis modules 130.

With continuing reference to FIG. 11, each analysis control data structure further comprises an analysis execution start data 140 which includes a start token 142 and an active token table pointer 144. The start token 142 provides a pointer to the trunk of the analysis tree for a particular analysis, e.g., the starting control-level analysis module 150 in routing analysis, while the active token table pointer 144 provides a pointer to the "active" analysis module token table 146 which references the analysis modules 130 used to perform an analysis. The active token table pointer 144 permits the use, in parallel, of several analysis module token tables including the active analysis module token table 146, which is used for analyzing actual traffic through the network, and one or more "passive" analysis module token tables, e.g., analysis module token table 148, which may be used by the operator to modify, e.g., to build more analysis modules 130 within, the analysis control data for a particular analysis while the active analysis module token table 146 is being used for performing the actual analysis, i.e., executing analysis modules 130.

Each of the analysis module token tables 146 and 148 is indexed by a module token which points to the actual storage locations (addresses) of the analysis modules 130. As with the analysis primitive function token and the analysis primitives 120, the use of the module token, i.e., the indirect token-threaded technique, in place of pointing directly with a pointer to the analysis modules 130, facilitates reallocation of memory, e.g., moving, modifying and replacing analysis modules 130 within memory. In particular, modification of the analysis control data for a particular analysis, which may be in the order of several megabytes, may be accomplished indirectly by modifying the pointers (to the analysis modules) in one of the passive analysis module token tables. To modify a particular analysis, e.g., routing analysis, the operator may simply copy the contents of the active analysis module token table 146 into the passive analysis module token table 148 (copy the pointers instead of copying the analysis modules), modify at least some of the pointers to the analysis modules 130, test the new analysis structure and activate (change the value of the active token table pointer 144 so that it points to) the analysis module token table 148 after testing has been completed.

According to FIG. 11, the analysis control data for each analysis, e.g., digit analysis control data 134 or routing analysis control data 136, includes a pointer to the trunk of the analysis, i.e., the start token 142 points to the starting point for the analysis. If desired, however, each analysis may have more than one possible starting point, i.e., several different possible starting control-level analysis modules 130 within the same analysis control data structure. For this purpose, the start token 142 may be moved from the analysis execution start data 140 to the analysis control data dictionary 132 to form a third column such that each entry in the analysis control data dictionary 132 will have three attributes, namely, an external name, an analysis control data pointer and a start token. This implementation, in effect, allows the creation of different analyses within the same analysis control data structure with each different analysis being identified by a different external name which will be translated into both a pointer to the corresponding analysis control data and a pointer to the corresponding starting analysis module 130 in the corresponding analysis control data. For example, the external names "Routing Analysis-1," "Routing Analysis-2" and "Routing Analysis-3" will point to the same analysis control data, namely, the routing analysis control data 136, but each will point to a different starting analysis module 130.

Referring next to FIG. 12, the structure of a common type of control-level analysis modules 130 which may be used, for example, in routing analysis is comprised of an analysis administrative module header 160, a primitive function token 162, a parameter area 164 and a next module reference area 166 (the contents of this structure are configured as a set of consecutive memory locations for the purpose of clarifying the description only). The analysis administrative module header 160 is used for administrative purposes and may store, for example, the compiled name of the control-level analysis module 130. The primitive function token 162 references either a high-level analysis primitive 120 or a high-level analysis module 120. During execution, the primitive function token 162 is translated by the analysis primitive function token table 106, or by the analysis module token table 146 of the routing analysis control data 136, into a pointer to the do procedure of the particular analysis primitive 120 which interprets this particular type of control-level analysis module 130.

For the analysis module 130 shown in FIG. 12, the primitive function token 162 may reference a high-level analysis primitive 120 of the type "index selector" and the contents of the parameter area 164 and the next module reference area 166 may be as shown in FIG. 13. The parameter area 164 contains a reference to the parameter or data to be analyzed, e.g., stores the parameter ID 74 which points to a parameter value in the call control data 54, and a maximum value for the referenced parameter (in general, the parameter area 164 may contain a combination of constants, etc., and references to call data, depending on the function of the analysis primitive referenced by the primitive function token 162). The next module reference area 166 contains a table of analysis module tokens which is indexed by the index selector analysis primitive 120 to select a module token which, in turn, is translated by the analysis module token table 146 into a pointer to the next analysis module 154.

As discussed heretofore, the specific contents and organization of information in the control field 60 of any control-level analysis module 130 depend on the type of high-level analysis primitive 120 (or, equivalently, the type of high-level analysis module 130) referenced by the primitive function token 162, i.e., the high-level analysis primitive 120 (or high-level analysis module 130) used to interpret this particular type of control-level analysis module 130. FIGS. 12–13 show the case where the primitive function token 162 references an index selector analysis primitive 120 and the control field 60, therefore, consists of the parameter area 164 and the next module reference area 166. In other cases where the primitive function token 162 references, for example, a circular distribution selector of the type shown in FIG. 9A or a time-dependent selector of the type shown in FIG. 9B, the control field 60 does not store a parameter ID 74 or an indexed table of analysis module tokens, but stores instead other types of control data 76, e.g., in FIG. 9A, the last used outlet circular counter 76b and tokens to other analysis modules 130 which may be alternatively selected as the next analysis module 130. It will be appreciated, therefore, that many variations on the structure of the analysis module 130 shown in FIG. 12 are possible and that only the primitive function 162 is a necessary element of the structure of each control-level analysis module 130.

Execution State

In the preferred embodiment, the general analysis system of the present invention operates in one or both of two states, namely, execution and compilation. In the execution state, the analysis interpreter procedure 108 uses the do procedure 112 of the analysis primitive functions 120 to perform an analysis. To illustrate, assume that the call control program 56 has ordered the analysis interpreter procedure 108 to begin the execution of a particular analysis. As described heretofore, the call control program 56 sends to the analysis interpreter procedure 108 the input data 44 to be used in the analysis. The input data 44 includes the external name of the analysis sought, e.g., "Digit Analysis" or "Routing Analysis," which specifies the starting point for the analysis, i.e., the trunk of the analysis tree. The input data 44 also includes a parameter record pointer which points to the call control data for a call being analyzed (call record) 116 and, possibly, other information which is specific to the particular analysis.

As shown in FIG. 10, the parameter record pointer and the other information are stored in the analysis execution input data handler 110 to be used later. The external name of the analysis, on the other hand, is routed to the analysis control data dictionary 132 which, as shown in FIG. 11, contains a listing of all the different analysis control data which may be called by the call control program 56. A search of the analysis control data dictionary 132 for the external name sent by the call control program 56 returns a pointer to the appropriate analysis control data for the desired (named) analysis. Assuming, for example, that the call control program 56 has requested routing analysis, e.g., sent the external name "Routing Analysis" to the analysis interpreter procedure 108, the analysis control data dictionary 132 will return a pointer to the routing analysis control data 136.

As shown in FIG. 11, the routing analysis control data 136 includes the analysis execution start data 140 which contains both the start token 142 and the active token table pointer 144 for routing analysis. The start token (value 28 in FIG. 11) is used to index the active analysis module token table 146 indicated by the active token table pointer 144 in order to obtain a pointer to the first control-level analysis module 150 in routing analysis, i.e., the trunk of the routing analysis tree. The primitive function token 162 in the first control-level analysis module 150 is used to index the analysis primitive function token table 106 (or the analysis module token table 146) in order to obtain a pointer to the do procedure 112 of the high-level analysis primitive function 120 (or the high-level analysis module 130) which is associated with, i.e., capable of interpreting, the particular structure and contents of the control field 60 of the first analysis module 150, e.g., the parameter area 164 and the next module reference area 166 for an index selector type analysis module 150.

Further assuming, for example, that the primitive function token 162 of the first control-level analysis module 150 references an index selector type analysis primitive function 120, the do procedure 112 of the index selector analysis primitive 120 reads the parameter ID 74 from the parameter area 164 of the first control-level analysis module 150 and calls the analysis execution input data handler 110 which, in turn, sends a request to the call control data storage handler 118 to read the parameter value associated with the parameter ID 74 in the call control data for the call being analyzed 116. This parameter value is sent to and used by the do procedure 112 of the index selector analysis primitive 120 to select the appropriate outlet from the next module reference area 166 in the first analysis module 150, i.e., the next analysis module 130 to be executed after execution of the first analysis module 150. The next analysis module 152 may then be executed as illustrated in FIG. 13. For convenience, the second analysis module 152 is also assumed to reference an index selector type analysis primitive 120.

Referring next to FIG. 13, a pictorial illustration of the execution of the second analysis module 152, after the first analysis module 150 in FIG. 11 has been executed, may now be seen. As described above, a pointer (token) to the second analysis module 152 was selected based on the outcome of the analysis made by the first analysis module 150 in the routing analysis tree. The analysis interpreter procedure 108 reads the primitive function token 162 in the analysis module 152 and registers, for example, the value 93 which points to the analysis primitive function 120 named "Index Selector." The value 93 is translated in the analysis primitive function token table 106 into a pointer to the do procedure 112 of the analysis primitive function Index Selector. The do procedure 112 of the analysis primitive function Index Selector will then read the data in the parameter area 164 of the analysis module 152. As shown in FIG. 13, the parameter area 164 of the analysis module 152 includes both a parameter ID 74 for the parameter "origin" and a maximum value allowed for this analysis of "origin" by the analysis module 152. As will be seen shortly, the analysis primitive function Index Selector selects an outlet from the next module reference area 166 of the analysis module 152 depending on the value of the "origin" parameter in the call control data block 116.

In general, the parameter "origin" is used to identify a group of subscribers which are treated by the exchange in the same manner for call processing purposes (there may be different "origin" parameters for routing, charging, etc.). For routing purposes, the value of the parameter "origin" may denote, for example, not only the area code assigned by the national numbering plan to the central office area but also that part of the geographic area served by the central office in which the A-subscriber is located or other types of origin such as the business group to which the A-subscriber belongs. The maximum allowable value for the routing "origin" parameter depends on the numbering plan, the type of subscription, etc., and, in this instance, is chosen to be 7 (a value of the "origin" parameter greater than 7 may indicate, for example, either an error in processing or, alternatively if the values 8 and 9 are reserved for business (PBX or centrex) groups, a call from a business subscriber which requires further analysis of "origin" in another analysis module).

With continuing reference to FIG. 13, the do procedure 112 of the analysis primitive function Index Selector sends the parameter ID 74 for "origin" to the analysis execution input data handler 110 which, in turn, requests the call control data storage handler 118 to read the "origin" data in the call control data for the call being analyzed 116. The parameter value of the "origin" data, here 4, is then sent to the do procedure 112 of the analysis primitive function Index Selector. The do procedure 112 of the analysis primitive function Index Selector accesses the maximum allowable value from the parameter area 164 of the analysis module 152 and compares the "origin" parameter value to the maximum allowable value.

If the "origin" parameter value is less or equal to the maximum allowable value, the do procedure 112 of the analysis primitive function Index Selector uses the "origin" parameter value to index a table in the next module reference area 166 of the analysis module 152 and selects the appropriate outlet from the analysis module 152, i.e., the analysis module token for the next analysis module to execute. However, if the "origin" parameter value was greater than 7 (because of an error in processing or the call was from a business subscriber, for example), the out of range analysis module token is selected and translated by the active analysis module token table 146 into a pointer to a predetermined control-level analysis module 130.

In this case, since the "origin" parameter value (4) is less than the maximum allowable value (7), the analysis module token indexed by the parameter value (4) is selected and translated by the active analysis module token table 146 into a pointer to the next control-level analysis module 154. The next analysis module 154 is then executed in a similar manner to the execution of the analysis module 152. The analysis continues along these lines with one analysis module 130 sequentially executed after another analysis module 130 in the routing analysis tree. Some of the analysis modules 130 in the routing analysis tree will generate intermediate or final results of the analysis (the final result analysis modules 130 will be end points in the analysis tree). The result generating analysis modules 130 are interpreted by result generating analysis primitives 120 (or result generating analysis modules 130) and the results may be fed back to the call record 116 in the call control data 54 for use in one or more subsequent analyses or in controlling some external process.

Compilation State

In the preferred embodiment of the present invention, the compilation state is invoked when the operator uses the facilities of the operator interface 200 (which communicates with the analysis build procedure 102) to create new analysis modules 130. The operator may create new analysis modules 130 which belong to any of the three different categories discussed heretofore: (i) low-level analysis modules comprising words (subroutines) which can be called from other low-level analysis modules and from high-level analysis modules, (ii) high-level analysis modules comprising defining words (build procedure and do procedure) which function like the high-level analysis primitive functions, and (iii) control-level analysis modules which may be linked to other control-level analysis modules in an analysis structure using the analysis module tokens in their control fields 60, e.g., the analysis module tokens in the next module reference area 166 of the analysis module 152 shown in FIG. 13. The analysis structure which includes the new control-level analysis modules 130 may be (i) an analysis superstructure which forms a complete analysis, e.g., digit analysis or routing analysis, or (ii) an analysis substructure which may be called from several places in an analysis.

An analysis substructure may be used, for example, in selecting a particular route for a call being processed. Such a substructure may include actions which should be performed each time the route is selected from different parts in a routing analysis, e.g., collecting statistics on call routing or a regulation of the amount of traffic directed to a particular route. Other substructures may be used to represent analysis control data which is the same in several central offices and, thus, can be prepared once by the operator and later be delivered via the operator interface 200 to the general analysis system in each central office. Such other substructures may be used, for example, in the routing analysis of emergency numbers, e.g., the number 911, or of international calls.

In the preferred embodiment, the analysis primitive functions 130 are built-in or hard-coded within the general analysis program 40 and are of types which are generally either application-neutral, i.e., intended for use in different applications, or user-neutral, i.e., intended for use by different users of the same basic application (call processing, for example), or both. Each of the high-level analysis primitives 120 includes a build procedure 114 and, therefore, can be used to instansiate new control-level analysis modules of a particular type in a manner somewhat analogous to the use of a built-in defining word in Forth to define new Forth words. By also including a set of low-level analysis primitive functions 120 similar to some of the built-in words of Forth, e.g., a procedure defining word PROC (similar to ":" in Forth) and the <BUILD and DOES> procedures, the operator interface 200 may also be used to create new low-level and high-level analysis modules 130. The high-level analysis modules 130, in turn, may be used to instansiate application-specific or user-specific control-level analysis modules 130 tailored to the specific needs of the application or the desires of the user. In the call processing application, for example, the switch operator can instansiate new control-level analysis modules 130 and fill them with control data which describes the particular configuration of the operator's network (numbering plan, etc.).

The low-level and high-level analysis modules 130 are not built-in or hard-coded in the general analysis program 40 but are built by the user and stored in the analysis control data 42. The low-level analysis modules 130 are recursively defined from low-level analysis primitive functions 120 in a manner somewhat analogous to the definition of new Forth words from built-in Forth words. The low-level analysis modules 130 and the low-level analysis primitive functions 120, in turn, may be used to define new high-level analysis modules 130 in a manner somewhat analogous to the definition of new Forth defining words from user-defined and built-in Forth words. The new high-level analysis modules 130 are used, just like the high-level analysis primitive functions 120, to define new control-level analysis modules 130 in a manner somewhat analogous to the definition of new Forth words from user-defined defining words. Each new high-level analysis module 130 will use the <BUILD and DOES> functions to specify both the compile-time behavior (corresponding to the build procedure 114) and the execution-time behavior (corresponding to the do procedure 112) of every new control-level analysis module 130 defined by it.

To build a new application-specific or user-specific analysis superstructure or substructure, one or more of the built-in low-level analysis primitives functions 120, i.e., words (subroutines), may first be used to generate (define) new low-level analysis modules 130, i.e., new recursively defined subroutines (new versions of <BUILDS or DOES>, for example). The built-in low-level analysis primitive functions 120 and the user-defined low-level analysis modules 130 may then be used to define new high-level analysis modules 130, i.e., defining words, which, in turn, can be used together with the built-in high-level analysis primitive functions 120 to compile new control-level analysis modules 130 in the analysis tree (as will be become clear from the description below, the execution of the low-level and high-level analysis primitives 120 or analysis modules 130 normally ends with a CALL RETURN while the execution of the control-level analysis modules 130 normally ends with a GO TO connection to the next control-level analysis module in the analysis tree).

The following text provides examples of how the operator interface 200 in the preferred embodiment of the present invention may be used to (i) instansiate new control-level analysis modules 130 from built-in high-level analysis primitive functions 120, (ii) define new low-level analysis modules 130 from (built-in) low-level analysis primitive functions 120, (iii) define new high-level analysis modules 130 from low-level analysis primitive functions 120 and low-level analysis modules 130 (the low-level analysis primitive functions 120 and the low-level analysis modules 130 are generally subroutines which may used for defining either low-level analysis modules or high-level analysis modules) and (iv) instansiate new control-level analysis modules 130 from user-defined high-level analysis modules 130. In the following examples, the words input through the operator interface 200 are presented in uppercase to distinguish them from English words.

General Overview of the Compilation of Control-level Analysis Modules

The analysis build procedure 102 and the build procedure 114 of built-in high-level analysis primitive function 120 or an earlier-defined high-level analysis module 130 may be used in tandem to define new control-level analysis modules 130 within a particular analysis control data, e.g., routing analysis control data 136. In general, the definition of each new control-level analysis module 130 will include the name of the analysis control data corresponding to a particular analysis, e.g, routing analysis, in which the new control-level analysis module 130 is to be inserted, and the name of the defining word corresponding to a particular high-level analysis primitive function 120 or high-level analysis module 130, e.g., "Index Selector," which provides a general skeleton (template) of one type (class) of control-level analysis modules of which the new analysis module 130 is a specific instance (object). The analysis build procedure 102 will use the analysis control data. dictionary 132, and the analysis primitive function dictionary 104 or the analysis module dictionary 138, to identify the analysis control data, and the build procedure of the high-level analysis primitive function 120 or high-level analysis module 130, named in the definition, respectively.

In the compilation of control-level analysis modules 130, the operator enters information which may be divided into two parts (this division, however, is a matter of design choice). The first part consists of information (i) which is entered by the operator for all control-level analysis module types (families), regardless of the particular type of control-level analysis module being defined, and (ii) which is handled by the analysis build procedure 102 (a group of control-level analysis modules are of the same "type" or "family" if they are defined or built from the same high-level analysis primitive function 120 or the same high-level analysis module 130). This information includes the external name of the analysis, the external name of the new control-level analysis module, certain administrative information and the external name of the high-level analysis primitive function 120 or high-level analysis module 130 which is used to instansiate the new control-level analysis module. The administrative information and the external name of the high-level analysis primitive function 120 or high-level analysis module 130 will be compiled into the analysis administrative module header 160 and the primitive function token 162, respectively, of the new control-level analysis module 130.

The second part of the operator input consists of information (i) which is specific for a certain control-level analysis module type, i.e., depends on the type of high-level analysis primitive function 120 or high-level analysis module 130 which is used to define the new control-level analysis module 130, and (ii) which is handled by the specific build procedure of that analysis primitive function 120 or that analysis module 130. This information (certain parameter values) will be compiled into (contained in) the control field 60 of the new control-level analysis module. For the exemplary type of control-level analysis module 130 shown in FIG. 12, this information includes the parameter ID 74 which is compiled into the parameter area 164, and the external names of the next analysis modules (except for those control-level analysis modules 130 which will be end points in the analysis and, therefore, will have none) which are compiled into the next module reference area 166 of the new control-level analysis module 130.

Compilation of Control-level Analysis Modules from High-Level Analysis Primitive Functions To illustrate, take the case of creating a control-level analysis module of the type "Index Selector" shown in FIG. 13, i.e., a control-level analysis module 130 which references the Index Selector analysis primitive 120. The operator may create the "Index Selector" control-level analysis module 152 by issuing an order to the analysis build procedure 102 (FIG. 10) via the operator interface 200. This order will contain the following items:

1. The command word to create a new analysis module.
2. The external name of the analysis control data in which the new analysis module will reside, e.g., "Routing Analysis" (for the routing analysis control data 136 in FIG. 11).
3. The external name of the analysis module to be created, e.g., "RA275."
4. Administrative information, e.g., "origin for routing," which will be compiled into the analysis module administrative header 160 of the newly created analysis module 152.
5. The external name of the analysis primitive function 120, e.g., "Index Selector," to be used in compiling (and executing) the new analysis module.
6. Information which is specific to the selected analysis primitive function. In this example (Index Selector), the following information is necessary:
   a. The parameter ID 74 for the call control data parameter to be analyzed, e.g., the ID 74 for "origin" (here, origin for routing purposes). This parameter ID 74 may be a token value or, alternatively, may be given a symbolic external name which is translated into a token value by using a catalogue function.
   b. An indication of the total number of possible outlets from the new analysis module, i.e., the highest (maximum) index value of the analyzed parameter for which a next analysis module should be assigned.
   c. For each outlet (including the out-of-range outlet), the external name of the analysis module which should be assigned as the next analysis module for that outlet.

In the preferred embodiment of the present invention, operator interface 200 is a computer-computer interface which is configured according to the OSI model and which may be given an arbitrary syntax. The following syntax is but one example of how the syntax for operator order to create an "Index Selector" analysis module may be formed:

CREATE ROUTING ANALYSIS :RA275 "ORIGIN FOR ROUTING" INDEX_SELECTOR(58, 4, RA187, RA198, RA99, RA0, RA99, RA33)

This order (text string) from the operator is read and evaluated (interpreted) by the analysis build procedure 102 and the build procedure 114 of the analysis primitive function "Index Selector" in the following steps:

1. The analysis build procedure 102 recognizes the order to create a new analysis module, i.e., the keyword "Create" (item 1), and invokes the appropriate inner parts which perform the "Create" function. Other orders which the analysis build procedure 102 may recognize include orders to modify parameter values in (contents of) existing analysis modules 130, and orders to change the active analysis module token table 146 in the analysis control data 136, e.g., modify the value of the active token table pointer 144 to point, instead, to the analysis module token table 148.
2. The invoked parts of the analysis build procedure 102 extract the external name of the analysis, i.e., "Routing Analysis" (item 2), and then use the analysis control data dictionary 132 (which contains a listing of earlier-defined analysis) to translate "Routing Analysis" into a pointer to the analysis control data 136.
3. The invoked parts of the analysis build procedure 102 now extract the external name of the new analysis module, i.e., "RA275" (item 3). The external name of the new analysis module is entered into the analysis module dictionary 138 and an unused module token, e.g., the value 65, is assigned to the new analysis module.
4. The invoked parts of the analysis build procedure 102 extract the external name of the analysis primitive function, i.e., "Index Selector" (item 5), and then use the analysis primitive function dictionary 104 (which contains a listing of earlier-defined analysis primitive functions 120) to translate "Index Selector" into a primitive function token which points to this analysis primitive function, e.g., the value 93.
5. The invoked parts of the analysis build procedure 102 use the analysis primitive function token table 106 to translate the primitive function token (found in step 4) into a pointer to the build procedure 114 of the analysis primitive function Index Selector, and then begin execution of this build procedure 114. At this point, control passes from the analysis build procedure 102 to the build procedure 114 of Index Selector.
6. The build procedure 114 of the analysis primitive function Index Selector extracts the information which is specific to Index Selector (item 6), allocates memory space for a new index selector analysis module in the form of FIG. 12 and fills the parameter area 164 and the module reference area 166 with the appropriate values in the following steps:
   a. The build procedure 114 of the analysis primitive function Index Selector extracts the parameter ID 74 of the call control data parameter to be analyzed, i.e., the token value (58) for "origin" (item 6a), and the maximum value of the call parameter, i.e., the value 4 (item 6b), from which the number of outlets from the new analysis module can be calculated (the number of spaces to be reserved in the next module reference area 166 is two more than the maximum value of the call parameter, i.e., 6 spaces here, one each for the values 0–4 and another one for out of range). At this point, the required size of the new analysis module is calculated, an empty analysis module of the appropriate size is allocated and the extracted information is written into the parameter area 164.

b. For each outlet (including the out-of-range outlet) named in the input text stream, the build procedure 114 of the analysis primitive function Index Selector extracts the external name of the analysis module (item 6c) and uses the analysis module dictionary 138 (which contains a listing of earlier-defined analysis modules 130) to find the corresponding module token. This module token is placed in the appropriate slot in the next module reference area 166. At this point, the execution of the build procedure 114 of the analysis primitive function Index Selector ends and control is passed back, and a pointer to the new analysis module is returned, to the initially invoked parts of the analysis build procedure 102.

7. The invoked parts of the analysis build procedure 102 write the returned pointer to the new analysis module, and the module token (found in step 3), into the inactive (passive) analysis module token table 148, i.e., the pointer is written into slot 65 in the passive analysis module token table 148. The new analysis module is thereby "tied" to the routing analysis control data 136.

8. The invoked parts of the analysis build procedure 102 write the primitive function token, i.e., the value 93 (found in step 4), into the primitive function token field 162 of the new analysis module and also write the administrative information, i.e., "origin for routing" (item 4), into the administrative header 160 of the new analysis module. The analysis administrative module header 160 will, therefore, contain a short description of the new analysis module ("origin for routing") and the primitive function token 162 will index a pointer to the do procedure 112 of the analysis primitive function Index Selector which is executed when the new analysis module ("RA275") is analyzed (interpreted).

Once defined, the new analysis module RA275 may be used in routing analysis by copying the corresponding module token and pointer from the inactive analysis module token table 148 (step 7) to the active analysis module token table 146. When RA275 is executed, the do procedure 112 of the analysis primitive function 120 Index Selector indicated by the primitive function token 162 is executed. The do procedure 112 of Index Selector will simply index the table of analysis module tokens in the next module reference area 166 and select the analysis module token corresponding to the value of the "origin" call parameter. For example, if the value of "origin" is 0, then RA187 will be selected; if the value of "origin" is 1, then RA198 will be selected; and so on. Hence, the routing analysis will follow one of the analysis module tokens in the next module reference area 166 of RA275 to the next analysis module 130 in the analysis tree.

Notice that the pointer to the new analysis module 130 was first inserted in the passive analysis module token table 148 and then transferred to the active analysis module token table 146. In general, all modifications to the routing analysis control data 136 are made in the passive analysis module token table 148. In practice, the operator will wish to create or modify an analysis superstructure or substructure comprised of several control-level analysis modules 130, rather than only one control-level analysis module 130, at any time. For this purpose, the contents of the active analysis module token table 146 are first copied into the passive analysis module token table 148. This step allows the active analysis module token table 146 to continue to be used in the routing analysis of telephone traffic while the analysis superstructure or substructure is being modified in the passive analysis module token table 148, and further ensures that these token tables will be internally consistent with each other.

The modifications to the analysis control data may consist, for example, of a series of definitions of new analysis modules 130 to which pointers are inserted into the analysis module token table 148, or of a series of modifications to the parameter values in existing analysis modules 130 which effectively produces a new analysis superstructure or substructure. Once modified, the analysis superstructure or substructure may be checked for errors, e.g., endless loops, loose ends, etc., and then committed to the traffic by changing the value of the active token table pointer to point to the analysis module token table 148 instead of the analysis module token table 146. The formerly active analysis module token table 146 will be saved for a predetermined period of time, e.g., 24 hours, until the efficacy of the now active analysis module token table 148 may be judged. If traffic disturbances should develop, the analysis module token table 146, which points to a proven set of analysis modules 130, may be recommitted (reactivated) to the traffic.

In Appendix A, a set of high-level analysis primitive functions 120 which may be used in instansiating new control-level analysis modules is described. This set is intended to further exemplify the types of high-level functions which may be used within the preferred embodiment of the present invention, i.e., the application of the general analysis system for the control of call processing in a telecommunications system, e.g., a central office. As will be appreciated by persons of ordinary skill in the art, many other high-level analysis primitive functions may be implemented.

Compilation of Low-level Analysis Modules

The following line of input to the general analysis system illustrates the use of some of the low-level analysis primitive functions 120 described in Appendix C to define a new low-level analysis module:

PROC 2* DUPLICATE ADD ENDPROC

The first item (PROC) and the last item (ENDPROC) are low-level analysis primitive functions 120 which are used for building new low-level analysis modules 130 in a manner somewhat analogous to the use of ":" and ";" in Forth. Each new low-level analysis module 130 defined by PROC will contain the compiled definition, i.e., the compiled words between PROC and ENDPROC (2*, DUPLICATE and ADD). The second item (2*) is the external name for the new low-level analysis module. The third and fourth items (DUPLICATE and ADD) are low-level analysis primitive functions 120 which implement the function of the new low-level analysis module 130. In this example, the function is to replace the value of the item on the top of an execution-time stack with twice the value (the term "stack" refers to a sequential list of items from which items may be appended or removed such that the value removed is the last appended to the stack, i.e., as well known in the art, this is referred to as a last-in-first-out, or LIFO, stack). The effect on the stack from the execution of the low-level analysis primitive functions DUPLICATE and ADD is described in greater detail in Appendix C.

The newly-generated low-level analysis module 130a named 2* is shown in FIG. 14. The primitive function token 162 references an entry for the low-level analysis primitive function PROC 120a in the analysis primitive function token table 106. The control field 60 compiled by the build part of the PROC analysis primitive function 120a consists of a sequence of function tokens which reference the entries for the low-level analysis primitive functions DUPLICATE 120c, ADD 120d and ENDPROC 120b in the analysis primitive function token table 106. The new low-level analysis module 130a will be assigned an analysis module token value and will be inserted into the analysis control data such that it may be referenced with the external name (2*) when compiling other analysis modules, and with the assigned analysis module token when executing an analysis. In other words, any subsequently compiled word may call the word 2* as if it were any other word (a word is called by simply using its name in the input definition). When called, 2* performs its function and then returns (this is analogous to the execution of a subroutine call).

Compilation of High-level Analysis Modules

The following items of input to the general analysis system illustrate the use of some of the low-level analysis primitive functions 120 described in Appendix C, and the low-level analysis module 2* defined above, to define a new high-level analysis module 130 which may be used for compiling and executing control-level analysis modules within an analysis tree:

| INPUT | FUNCTION AND OPERATION |
|---|---|
| PROC 4SELECTOR | |
| <BUILDS | Starts compile time actions. |
| 0 | Starts offset within the new analysis module. |
| INSERT_CALLPARM | Inserts parameter ID 74 for the call parameter. |
| INSERT_MODULE | Inserts analysis module token for value = 0. |
| INSERT_MODULE | Ditto for value = 1. |
| INSERT_MODULE | Ditto for value = 2. |
| INSERT_MODULE | Ditto for value = 3. |
| DOES> | starts execute time actions. |
| 0 | The offset to the parameter ID 74 in the analysis module 130. |
| FETCH_PARAMETER | Accesses call control data storage handler 118 through the analysis execution input data handler 110 and pushes the value of the parameter for the call being analyzed 116 onto the stack. |
| 1 ADD 2* | Calculates the offset within the analysis module to the outlet for the value (the analysis module token is assumed to be 2 bytes long). |
| PERFORM | Reads the analysis module token at the offset indicated by the value at the top of the stack and performs a jump to that analysis module. |
| ENDPROC | |

The function of the analysis modules compiled with the defining analysis module 4SELECTOR is to select an outlet depending on the value, in the range 0–3, of a call parameter in the call control data 116 (the high-level analysis module 4SELECTOR, with four outlets, functions much like the high-level analysis primitive function SELECTOR, with 10 outlets, discussed heretofore in connection with FIG. 8). As with the definition of 2*, the definition of 4SELECTOR is enclosed within the low-level analysis primitive functions PROC and ENDPROC. The definition of 4SELECTOR, however, is divided into a build procedure which is enclosed within the low-level analysis primitive functions <BUILD and DOES> and a do-procedure which is enclosed within the low-level analysis primitive functions DOES> and END-PROC.

The build procedure of 4SELECTOR consists of a sequence of low-level analysis primitive functions 120 or earlier-defined low-level analysis modules 130 which specify how the analysis modules 130 of the 4SELECTOR type are compiled, i.e., they specify the operations which write the contents of the control field 60 of the created analysis module 130 (in the case of 4SELECTOR, the control field 60 will consist of the parameter area 164 and the next module reference area 166 as shown in FIG. 12). The low-level analysis primitive functions used within the build sequence are described in more detail in Appendix C.

The do procedure of 4SELECTOR consists of a sequence of low-level analysis primitive functions 120 or earlier defined low-level analysis modules 130 which specify how the analysis modules 130 of 4SELECTOR type are executed, i.e., they specify the operations which use the contents of the parameter area 164 and the next module reference area 166 to select the next analysis module 130 in the analysis tree. The low-level analysis primitive functions 120 (FETCH_PARAMETER, 0, 1, ADD and PERFORM) used within the do sequence are described in Appendix C while 2* is the low-level analysis module described above.

The newly-created high-level analysis module 130b named 4SELECTOR is illustrated in FIG. 15. The primitive function token 162 references an entry for the low-level analysis primitive function PROC 120a in the analysis primitive function token table 106. The control field 60, which was compiled by the build part of the PROC 120a, consists first of a portion recursively compiled by the build part of the <BUILD procedure and containing both a pointer to the do procedure and a function token which references the analysis primitive function <BUILD 120e. The remaining portions of the parameter area 164 compiled by the build part of the PROC analysis primitive function contain a sequence of function tokens which reference the analysis primitive functions 0 (the constant "0") 120f, INSERT_CALLPARM.120g, INSERT_MODULE 120h, DOES> 120i, FETCH_PARAMETER 120j, 1 (the constant "1") 120k, ADD 120l (120d in FIG. 14), PERFORM 120m and ENDPROC 120b, and the low-level analysis module 130a for 2*. The new high-level analysis module 130b will be assigned an analysis module token value and will be inserted into the analysis control data such that it may be referenced with the external name "4SELECTOR" when compiling other analysis modules, and with the assigned analysis module token when executing an analysis, e.g. routing analysis.

Once defined, the high-level analysis module 4SELECTOR may be used to instantiate new control-level analysis modules 130. At compile-time, i.e., when the build procedure of the 4SELECTOR is executed, INSERT CALL-PARM will insert into the new analysis module 130 being compiled a pointer to a call parameter, i.e., compiles the external name of the call parameter to be analyzed into a parameter ID 74 which references the location of this call parameter in the call record 116, and INSERT_MODULE (which is referenced four times in sequence) will insert into the analysis module 130 being compiled a sequence of four module indicators 80 (corresponding to the four call parameter values in the range 0 to 3) linking the analysis module 130 being compiled to the next analysis modules 130 in the analysis tree. At execution time, i.e., when the do procedure of 4SELECTOR is executed, FETCH_PARAMETER will fetch the parameter 46, e.g., a dialed digit, indicated by the parameter ID 74 from the call control data 54, and the sequence (1 ADD 2* PERFORM) will select for execution the next analysis module 130 which is indicated by the module indicator 80 associated with the value (0–3) of the parameter 46 in the 4SELECTOR type analysis module 130 being interpreted.

Compilation of Control-level Analysis Modules from High-level Analysis Modules

The following items of input to the general analysis system illustrate the use of the high-level analysis module 4SELECTOR to define (compile) a new control-level analysis module 130 in an analysis tree which resides, for example, in the routing analysis control data 136:

| INPUT | FUNCTION AND OPERATION |
|---|---|
| 4SELECTOR THISID | Orders the general analysis system to compile a new control-level analysis module with external name THISID of type 4SELECTOR. |
| LINECLASS | Compile-time input to the INSERT_CALLPARM in the build procedure of 4SELECTOR. INSERT_CALLPARM will insert the parameter ID 74 for the call parameter LINECLASS into the new analysis module. |
| MODULEID_0 | Compile-time input to the first INSERT_MODULE in the build procedure of 4SELECTOR. INSERT_MODULE will insert the analysis module token for the next analysis module in the analysis module tree to be selected if the value of LINECLASS is 0 (zero). |
| MODULEID_1 | Ditto for the second INSERT MODULE and for value = 1. |
| MODULEID_2 | Ditto for the third INSERT MODULE and for value = 2. |
| MODULEID_3 | Ditto for the fourth INSERT MODULE and for value = 3. |

The structure of the analysis module generated by these lines of input is illustrated in FIG. 16. The new analysis module 130c of 4SELECTOR type contains the value of a primitive function token 162 which references the defining analysis module 130b named 4SELECTOR via the analysis module token table 146. The parameter area 164 of the analysis module 130c contains a parameter ID 74 which references the call parameter LINECLASS in the call control data 116. The next module reference area 166 of the analysis module 130c contains a table of four analysis module tokens which reference, via the analysis module token table 146, the next analysis modules 130d, 130e, 130f and 130g to be selected for call parameter values 0, 1, 2 and 3, respectively.

Extensibility

Hence, just as new control-level analysis modules 130 may be defined from built-in high-level analysis primitive functions 120 and added to the analysis control data for a particular analysis, e.g., the routing analysis control data 136, new types of control-level analysis modules may be built from user-defined high-level analysis modules 130. For example, in the preceding description of how to create an Index Selector type analysis module, the build procedure of a high-level analysis module 130 rather than a high-level analysis primitive function 120 could have been used. The high-level analysis module 130, which functions like a high-level analysis primitive function 120, may be built from built-in low-level analysis primitives 120 and from earlier-defined low-level analysis modules 130 which, in turn, were recursively defined from the low-level analysis primitives 120. This extensibility of the general analysis system allows the user the freedom to build application-specific or user-specific analyses into the analysis control data 42 instead of taking delivery of a new release of the general analysis program which meets his particular requirements through special types of built-in functions.

For practical purposes and for optimal performance in real-time sensitive applications, most, if not all, of the frequently-used analysis primitive functions may be provided as built-in high-level analysis primitive functions 120 in the general analysis system. Rarely used or customer-specific analysis primitive functions may then be provided by user-defined analysis modules 130 which are generated from the built-in low-level analysis primitive functions 120 in the manner illustrated in FIGS. 14–16. In Appendix C, a set of low-level analysis primitive functions 120 is described. This set includes a number of examples of the different types of low-level analysis primitive functions 120 which may be used to provide the desired extensibility. As will be appreciated by persons of ordinary skill in the art, however, many other low-level analysis primitive functions 120 may be used.

In addition to building application-specific or user-specific analyses, the low-level analysis primitives 120 may be used to introduce new functionality into the general analysis system after a particular version has been released. This new functionality may, for example, (i) adapt the general analysis system to the particular requirements, e.g., statistics sampling, of a specific customer, e.g., a Bell Operating Company, or (ii) adapt a specific type of analysis to use a new analysis module family, e.g., comparison of a mobile subscriber location with a fixed subscriber location, or (iii) provide general extensions to the existing functionality. The new functionality may thereafter be provided through built-in analysis primitives 120 for greater performance (execution speed) in subsequent releases of the general analysis system, i.e., the high-level primitive functions may be provided through directly compiled code rather than through threaded code which indirectly references low-level primitives.

Compile-Time and Execution-Time Differences Between Analysis Primitives and Analysis Modules In principle, the general analysis system treats user-defined analysis modules 130 the same as built-in analysis primitives 120. There are, however, certain differences in their compilation-time and execution-time behavior. Specifically, the external names of the analysis primitives 120 will be found in the analysis primitive function dictionary 104 while the external names of the analysis modules 130 will be found in the analysis module dictionary of a particular analysis, e.g., the analysis module dictionary 138 in the routing analysis control data 136. Conversely, the primitive function token 162 (and any other function tokens) in any analysis primitive 120 or analysis module 130 may index either the analysis primitive function token table 106 or the analysis module token table 146 (see, for example, FIG. 15 where the function tokens in the high-level analysis module 130b point to both a low-level analysis module 130a and to several low-level analysis primitives 120a, 120b, 120e, 120f, 120g, 120h, 120i, 120j, 120k, 120l and 120m).

During the compilation state when the operator enters an order through the operator interface 200 to build a new analysis module 130 within a particular analysis, e.g., the routing analysis control data 136, the input definition of the new analysis module 130 may contain the external names of either built-in analysis primitives 120 or previously-defined analysis modules 130. For example, the definition of a new high-level analysis module 130 may contain the names of low-level analysis primitives 120 and low-level analysis modules 130. Similarly, the definition of a new control-level analysis module 130 may use a defining word which is either a high-level analysis primitive 120 or a high-level analysis module 130, and may contain the names of several previously-defined control-level analysis modules 130. Consequently, both the analysis primitive function dictionary 104 and the analysis module dictionary 138 may have to be searched in order to find each analysis primitive 120 or analysis module 130 named in the input text string.

During the execution state, after the new analysis module 130 has been built and added to the routing analysis control data 136, when the call control program 56 sends a request to execute the routing analysis control data 136, the function token 162 (and any other function tokens) in the new analysis module 130 may point either to a built-in analysis primitive 120 or to a user-defined analysis module 130. Consequently, both the analysis primitive function token table 106 and the analysis module token table 146 may have to be searched in order to translate the primitive function token 162 (and any other tokens) in the new analysis module 130 into a pointer to the analysis primitive 120 or the analysis module 130 which was earlier used by the operator to create the new analysis module 130.

Several search strategies may be developed to locate the analysis primitives 120 and the analysis modules 130 during compilation or execution. For example, in the compilation of a new control-level analysis module 130 for routing analysis, the search for the high-level primitive function (defining word) may start first with the user-defined analysis modules 130 followed by the built-in analysis primitive functions 120, i.e., the strategy may be to search the analysis module dictionary 138 in the routing analysis control data 136 for the name of the primitive function entered by the operator and, if this search fails to locate the name, commence a search in the analysis primitive function dictionary 104 (this search order is recommended because the user may, for example, choose to create an analysis module 130 which is a special version of an analysis primitive 120 and to use the name of the built-in analysis primitive 120 also for the user-defined analysis module 130). All the standard search speed-up techniques, including hash tables, may be used in performing these dictionary searches.

For efficient searching during execution (which is more time-sensitive than compilation), however, and to avoid searching in both the analysis primitive function token table 106 and the analysis module token table 146, the general analysis system may be given the ability to distinguish between the primitive function tokens and the analysis module tokens (which reference the built-in analysis primitives 120 and the user-defined analysis modules 130, respectively). While many techniques for differentiating between the primitive function tokens and the analysis module tokens may be applied within the preferred embodiment of the present invention, one relatively simple technique may be to use two different number ranges, e.g., positive and negative numbers, for the primitive function tokens and the analysis module tokens, respectively. If positive and negative numbers are used, for example, the most significant bit in the primitive function tokens may be assigned the value 0 and the most significant bit in the analysis module tokens may be assigned the value 1 (or vice versa). In this manner, the general analysis system can easily determine which of the two token tables 106 and 146 to search during execution.

Note that, in the preferred embodiment of the present invention, a separate dictionary and a separate token table are provided for the analysis primitives 120 (FIG. 10) on the one hand, and for the analysis modules 130 in each analysis control data structure (FIG. 11) on the other. In an alternative embodiment, the external names and tokens of both the analysis primitives 120, and the analysis modules 130 of all the different analyses, may be stored in the same dictionary and the same token table, respectively. One possible advantage, however, of separating the analysis modules 130 from the analysis primitives 120, and then separating the analysis modules 130 for one analysis from the analysis modules 130 for another analysis, is that the user of the general analysis system may build different analysis modules for each different analysis instead of having one large set for all analyses, i.e., the user extends the set of analysis modules for each analysis in modular fashion. Another possible advantage of separating the built-in analysis primitives 120 from the user-defined analysis modules 130 in the preferred embodiment is that the analysis primitives 120 may be stored in one place in memory which is accorded write protection (read access only) for security purposes, while the analysis modules 130 may be stored in another place in memory to which the user has read and write access.

Operator Interface

As will be appreciated by persons of ordinary skill in the art, several interfacing techniques may be implemented in connection with the operator interface 200. In the preferred embodiment of the present invention, the Telecommunication Management Network (TMN) framework is utilized and the operator interface 200, therefore, is a layered interface in accordance with the Open System Interconnection (OSI) model. See, for example, ANSI T1-210-1989 American National Standard for Telecommunications—Operations, Administration, Maintenance and Provisioning (OAM&P)—Principles of Functions, Architectures and Protocols for Interfaces Between Operation Systems and Network Elements.

In the top layer of the OSI model, the Common Management Information Service Elements (CMISE) protocol is used. CMISE provides a set of generic orders such as Set, Get, Delete, Modify, etc., which may be applied to the managed objects. In the general analysis system of the present invention, the managed objects comprise the analysis modules 130 in an analysis control data, e.g., the routing analysis control data 136. The information conveyed through CMISE in order to specify values for the managed objects is context-dependent, i.e., it depends on the type of the managed object. Incidentally, this context-dependent information could equally well be conveyed through other means such as a man-machine interface, e.g., a terminal directly connected to the general analysis system, which uses the Man Machine Language (MML) defined by CCITT, or a special syntax designed for the general analysis system.

The different possible implementations of the operator interface 200 may use different techniques to identify the analysis modules 130 but may use a common technique to express their internal structure. Using the normal facilities of a threaded interpretative language (TIL), the structure and value of an analysis module 130 may be expressed in a TIL source format, i.e., a text string (words and numbers)

containing the definition of the analysis module. In practice, the general analysis system may need to support more than one interface simultaneously and the operator interface 200 may then be considered to constitute an internal system interface which is common to several external interfaces. This situation is illustrated generally in FIG. 17.

Figure 17:
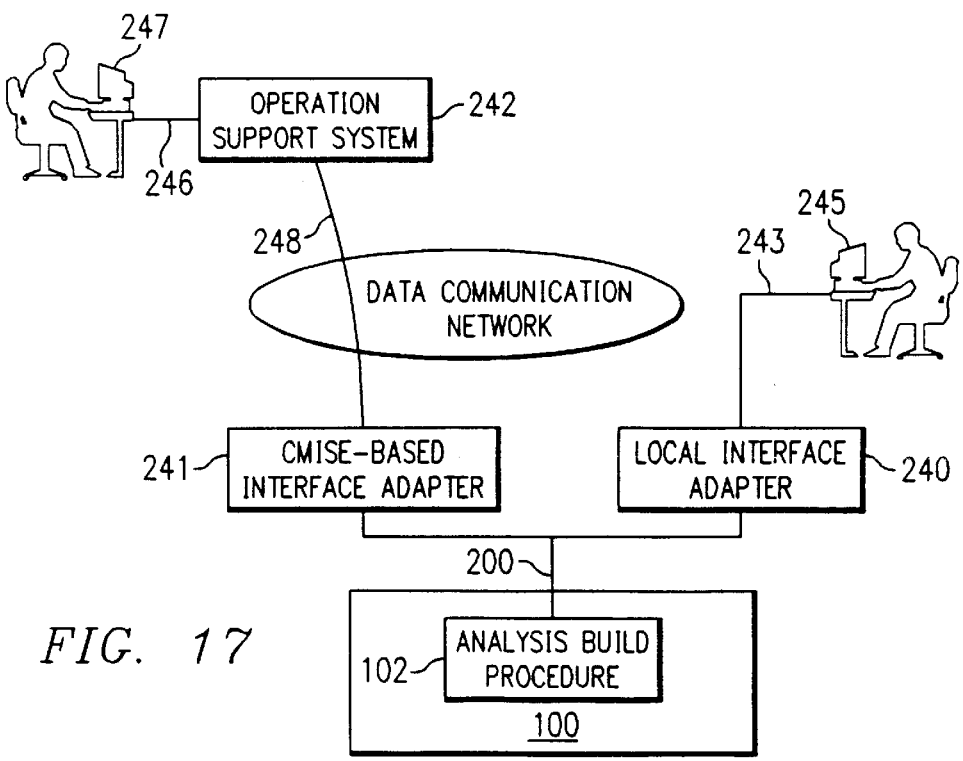
FIG. 17 is a pictorial illustration of an operator interface to the general analysis system of the present invention.

The operator interface 200 shown in FIG. 17 may be formed, for example, as a set of subroutines which provide a set of generic operations used to define new analysis modules, to delete or replace unused analysis modules, to control the use of the active and passive analysis module token table within any analysis control data, etc. The required input to a subroutine which, for example, inserts a new analysis module in the analysis control data may include (i) an identification of the analysis control data, i.e., the external name of the analysis, (ii) an identification of the analysis module, i.e., the external name of the analysis module, and (iii) the definition of the contents of the analysis module arranged in a TIL source format in the manner described earlier (compilation examples).

In FIG. 17, a local interface adapter 240 adapts the internal system interface 200 to an external system interface 243 to a text terminal 245 at which an operator may add to and modify the analysis control data for various analyses, e.g., the routing analysis control data 136. The external interface 243 may be formed, for example, as a text-based interface consistent with the examples given earlier for the compilation state of the present invention. The local interface adapter 240 translates the text stream from the operator of the terminal 245 into sequences of subroutine calls in the internal system interface 200. A CMISE-based interface adapter 241 is also used for communicating with an external operation support system 242 through an interface 248. The operation support system 242 is a support system which is used for the management of several telecommunication systems, e.g., switches, in a telecommunications network. The operation support system connects to a terminal 247 through an interface 246 which, for example, may be a graphics editor.

There are several different types of interfaces in use today between operation support systems and telecommunication systems. For purposes of the present description, the interface 248 between the operation support system 242 and the telecommunication systems which use the general analysis system of the present invention is assumed to be based on the framework given in ANSI T1-210-1989. This interface may be used on a direct data link between the operation support system 242 and the telecommunication systems which use the general analysis system or be connected through a data communication network using the CCITT recommendation X. 25. The interface 248 comprises protocols on all seven layers of the OSI model. In the top layer, the CMISE application service entity (ISO 9595-2, 9596-2) is used.

The CMISE-based interface adapter 241 connects the interface 200 to the operating support system 242 for the telecommunication systems which use the general analysis system, and translates the received CMISE actions into sequences of subroutine calls in the internal system interface 200. The CMISE actions include generic orders such as Set, Get, Create, Delete, etc. These operations contain parameters or attributes which identify the objects to which the action is directed. For instance, an action which inserts a new analysis module in the analysis control data will contain parameters which identify the analysis (corresponding to the external name of the analysis), identification of analysis modules (corresponding to the external name of the analysis module), and the definition of the contents of the particular analysis module. In the assumed framework, the CMISE operation is encoded using the ASN.1 Basic Encoding Rules defined in CCITT rec. X. 209. The contents of the analysis module may still be defined using a TIL source format embedded, however, in a parameter within the encoded CMISE operation.

The earlier-described examples of the use of the input to the general analysis system to (i) create from a high-level analysis primitive a new control-level analysis module within an analysis (ii) create a new low-level analysis module which may later be included in the definition of other analysis modules (iii) create a new high-level analysis module which may later be used to create new control-level analysis modules within an analysis, and (iv) instansiate from high-level analysis modules new control-level analysis modules, are all valid also for the case where the input to the general analysis system is using the CMISE-based interface adapter 241, although the encoding of the different input parameters which are required by the general analysis system will be somewhat different.

With the TIL feature, therefore, even a generic operation interface, e.g., CMISE, becomes extensible in accordance with the present invention. New functions can be added and the generic interface made more complex without actually changing the interface. The extensible interface can be used to add to the built-in analysis primitive functions new analysis primitive functions which are uniquely required for a certain analysis. While the user-defined analysis primitive functions may have an impact on the real-time processing capacity of the general analysis system, those which prove to be quite useful can always be hard-coded in the next release of the general analysis system for better performance without modifying any of the definitions in the then-existing analyses.

Highlights of the General Analysis System

To recapitulate some of features of the present invention, which may now be clearly understood in light of the foregoing discussion, a generalized structure of analysis control data, i.e., the analysis control data 42, may be stored much like a program in a data base and interpreted with a generalized interpreter, i.e., the general analysis program 40. Each specific analysis, e.g., routing analysis, may be represented by a number of analysis functions, i.e., the (control-level) analysis modules 130, which are stored as data in the analysis control data 42. At least some of the analysis modules 130 operate on a certain parameter(s) to produce a useful analysis, and these and other analysis modules 130 can be combined and recombined to produce a more complicated analysis. A standardized structure for each of the (control-level) analysis modules 130 includes a pointer to a specific interpreter subprogram, i.e., an analysis primitive function 120 which interprets a specific type of (control-level) analysis modules 130 in largely the same manner in every analysis, and a pointer to another (control-level) analysis module 130 which follows in the analysis. Consequently, an analysis can be easily modified by changing the pointers between the (control-level) analysis modules 130.

If an analysis requires a new function to be added to the analysis or a new parameter to be analyzed, one or more new analysis modules 130 may be built within the analysis control data 42 to provide the new functionality and to operate on the new parameter. The general analysis system of the present invention, therefore, is extensible and expandable from the standpoint of both new parameters and new types of analyses. Moreover, because of the generalized structure of the analysis control data 42, the operator interface can also be generalized and configured as a program which easily interfaces with different operator support systems. A high-level operator interface, may provide advanced tools which assist the operator in generating new analysis modules 130 within the analysis control data 42.

In this manner, the operator of the general analysis system of the present invention not only avoids the large cost of preparing the data for each analysis in the specific format required by prior art analysis systems, but can also tailor the analysis to meet the unforeseen demands of a particular industrial environment, e.g., telephone switching, without making any modifications to the general analysis program 40 which would otherwise be necessary according to the prior art analysis systems. This is made possible with the novel concept of the present invention since it is the data (analysis control data 42) which uses the program (general analysis program 40) instead of the program using the data, i.e., each (control-level) analysis module 130 itself points out which subprogram (analysis primitive function 120) to use in interpreting the data contained in the analysis module 130 instead of the subprogram pointing out which data to be interpreted. According to the present invention, new functions and new parameters which were not anticipated and accounted for in a particular version of the general analysis program 40 may be easily accommodated by defining new analysis modules 130 (including analysis modules 130 which act like analysis primitive functions 120) in the analysis control data 42.

The foregoing detailed description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

What is claimed is:

1. A general analysis system comprising:
   a data storage device;
   means for storing a general analysis program as a plurality of analysis primitives for performing at least one analysis on a set of data stored in said device;
   means for storing an analysis control data as a plurality of analysis modules for controlling said at least one analysis of said data set, each of said analysis modules being defined from and interpreted by one of said analysis primitives, and each of said analysis modules including:
      an indication of the analysis primitive which interprets its type; and
      control data which controls a part of said at least one analysis; and
   means for executing at least some of said analysis modules to perform said at least one analysis.

2. The general analysis system of claim 1 further comprising means for adding new analysis primitives for storage in said general analysis program storing means.

3. The general analysis system of claim 1 further comprising means for adding new analysis modules for storage in said analysis control data storage means.

4. The general analysis system of claim 1 wherein each of said analysis primitives interprets a particular type of said analysis modules.

5. A system for processing telephone calls comprising:
   at least one exchange; and
   in each exchange:
      a general analysis program including a plurality of analysis primitives;
      an analysis control data including a plurality of analysis modules; and
      a call control data including a plurality of call records, one for each telephone call through said exchange.

6. The system of claim 5 wherein said analysis modules are grouped into a plurality of analysis structures, each of which controls a different analysis.

7. The system of claim 6 wherein said analysis structures include a routing analysis structure and a destination analysis structure.

8. The system of claim 6 wherein each call record stores a plurality of call parameter values for at least one of:
   subscriber data including data on the service profile of an originating subscriber;
   subscriber input including the digits dialed by said originating subscriber;
   result(s) of an analysis performed by said general analysis program under the control of one of said analysis structures, said results being written into the call record by said general analysis program; and
   other data written into the call record by a call control program which orders said general analysis program to execute different analyses.

9. The system of claim 8 wherein said result(s) are used by said general analysis program to perform another analysis.

10. The system of claim 8 wherein said result(s) are used by said call control program to control call processing.

11. A method for controlling an industrial process comprising the steps of:
    storing a plurality of parameters for said industrial process;
    executing a plurality of analysis modules, each of which controls a part of an analysis of said parameters and at least one of which generates a result from said analysis, and wherein each of said analysis modules comprises:
       a function indicator which indicates a function to be executed when the referencing analysis module is executed; and
       a control field which contains control data to be interpreted by said function; and
    controlling said industrial process based on said result.

12. The method of claim 11 wherein said parameters include:
    input generated from said industrial process;
    data defining the characteristics of said industrial process; and
    result(s) of earlier-executed analyses.

13. The method of claim 11 wherein said result is an intermediate result from said analysis.

14. The method of claim 11 wherein said result is a final result from said analysis.

15. The method of claim 11 wherein said industrial process is a process for the connection of telephone calls and said parameters are call-related data.

16. The method of claim 11 wherein said control field includes at least one module indicator which indicates the next analysis module to be executed.

17. The method of claim 11 wherein said control field includes at least one parameter identification which identifies the location of a parameter in a memory.

18. The method of claim 17 wherein said function analyzes the parameter value stored in said memory location.

19. The method of claim 17 wherein said control field further includes at least one predetermined value and said function writes said predetermined value into said memory location.

20. A method for compiling and executing at least one analysis, used to control an industrial process, comprising the steps of:
 providing a plurality of high-level analysis primitives each of which includes a build procedure and a do procedure;
 compiling a plurality of control-level analysis modules using the build procedure of at least one of said high-level analysis primitives, said control-level analysis modules forming a tree structure which represents said at least one analysis; and
 executing each control-level analysis module in said tree structure using the do procedure of the high-level analysis primitive which was used to compile said control-level analysis module.

21. The method of claim 20 further comprising the steps of:
 providing a plurality of low-level analysis primitives;
 compiling a plurality of low-level analysis modules using said low-level analysis primitives;
 compiling a plurality of high-level analysis modules using said low-level analysis modules, each of said high-level analysis modules including a build procedure and a do procedure;
 compiling a plurality of new control-level analysis modules using the build procedure of at least one of said high-level analysis modules, said new control-level analysis modules being added to said tree structure; and
 executing each new control-level analysis module in said tree structure using the do procedure of the high-level analysis module which was used to compile said new control-level analysis module.

22. The method of 21 wherein said high-level analysis primitives and said low-level analysis primitives are built-in functions.

23. The method of 21 wherein said high-level analysis modules and said low-level analysis modules are user-defined functions.

24. A general analysis system comprising:
 means for storing a general analysis program as a plurality of low-level analysis primitives and a plurality of high-level analysis primitives, each of said low-level analysis primitives comprising a subroutine which performs a particular function, each of said high-level analysis primitives having a build procedure and a do procedure; and
 means for storing an analysis control data as a plurality of low-level analysis modules, a plurality of high-level analysis modules and a plurality of control-level analysis modules, each of said low-level analysis modules being compiled from at least one of said low-level analysis primitives, each of said high-level analysis modules having a build procedure and a do procedure, each of said control-level analysis modules being compiled with the build procedure and being interpreted with the do procedure of one of said high-level analysis primitives or one of said high-level analysis modules.

25. The general analysis system of claim 24 wherein said low-level and high-level analysis primitives are built-in and said low-level, high-level and control-level analysis modules are user-defined.

26. The general analysis system of claim 24 wherein each of said control-level analysis modules includes a function indicator which references the interpreting high-level analysis primitive or high-level analysis module, and a control field which contains control data for controlling a part of an analysis.

27. The general analysis system of claim 26 wherein each of at least some of said control-level analysis modules further includes a parameter identification which references a parameter to be analyzed by the referencing control-level analysis module.

28. A general analysis system comprising:
 means for storing a plurality of analysis control data structures for a plurality of analyses each having an external name, each of said analysis control data structures including:
  a plurality of analysis modules each having an external name and at least some of which are executed when an analysis is executed;
  an analysis module dictionary which translates the names of said analysis modules into corresponding module tokens; and
  at least one analysis module token table which translates said module tokens into corresponding pointers to said analysis modules;
 an analysis control data dictionary means which translates the names of said analyses into corresponding pointers to said analysis control data structures;
 means for storing a plurality of analysis primitive functions each having an external name and at least some of which compile and interpret particular types of said analysis modules;
 an analysis primitive function dictionary means which translates the names of said analysis primitive functions into corresponding primitive function tokens;
 an analysis primitive function token table means which translates said primitive function tokens into corresponding pointers to said analysis primitive functions;
 an analysis interpreter procedure means which initiates the execution of a selected analysis in response to the receipt of input data which includes the name of said selected analysis and a parameter record pointer which points to a record containing a set of parameters to be analyzed;
 an analysis execution input data handler which stores said parameter record pointer and enables said analysis primitive functions to access said parameters during the execution of said selected analysis; and
 an analysis build procedure means which initiates the compilation of new analysis module(s) in response to the receipt of an order which includes the name(s) of at least one analysis in at least one of said analysis control data structures, the name(s) of the analysis module(s) to be compiled and the name(s) of the analysis primitive function(s) to be used in compiling the new analysis module(s).

29. The general analysis system of claim 28 wherein each of said at least some analysis primitive functions includes a build procedure which is used for compiling a particular type of analysis modules and a do procedure which is used for interpreting said type of analysis modules, said analysis primitive function token table means translating the primitive function token for each of said at least some analysis primitive functions into two pointers, a first pointer to said build procedure and a second pointer to said do procedure.

30. The general analysis system of claim 28 wherein:

said input data is sent by a call control program means which controls the processing of telephone traffic through a telecommunications system; and said parameters comprise data related to at least one telephone call.

31. The general analysis system of claim 28 wherein:

said input data further includes other information which is specific to said selected analysis; and said other information is stored in said analysis execution input data handler.

32. The general analysis system of claim 31 wherein said other information includes pointers to other parameter records to be analyzed.

33. The general analysis system of claim 28 wherein said analysis execution input data handler communicates with a data storage handler which handles the reading and writing of parameter values from and into said parameter record.

34. The general analysis system of claim 28 wherein each of said analysis control data structures includes:

a plurality of analysis module token tables;

an active token table pointer which points to an active one of said analysis module token tables; and an analysis start token which references the first analysis module to be executed when an analysis is executed, and which is translated into a pointer to the first analysis module by said active module token table.

35. The general analysis system of claim 34 wherein said analysis start token and said active token table pointer reside in an analysis execution start data structure in each of said analysis control data structures.

36. The general analysis system of claim 34 wherein said analysis build procedure means receives an order to modify the value of said active token table pointer.

37. The general analysis system of claim 28 wherein the name of each of said analyses is translated into both a pointer to the corresponding analysis control data structure and a token to the first analysis module to be executed in the analysis.

38. The general analysis system of claim 28 wherein said order is entered through an operator interface which communicates with said analysis build procedure means.

39. The general analysis system of claim 28 wherein said analysis build procedure means receives an order to modify the contents of at least one preexisting analysis module.

40. A system for controlling an industrial process comprising:

means for storing a plurality of parameters for said industrial process;

means for executing a plurality of analysis modules, each of which controls a part of an analysis of said parameters and at least one of which generates a result from said analysis, and wherein each of said analysis modules comprises:

a function indicator which indicates a function to be executed when the referencing analysis module is executed; and a control field which contains control data to be interpreted by said function; and means for controlling said industrial process based on said result.

41. The system of claim 40 wherein said parameters include:

input generated from said industrial process;

data defining the characteristics of said industrial process; and result(s) of earlier-executed analyses.

42. The system of claim 40 wherein said result is an intermediate result from said analysis.

43. The system of claim 40 wherein said result is a final result from said analysis.

44. The system of claim 40 wherein said industrial process is a process for the connection of telephone calls and said parameters are call-related data.

45. The system of claim 40 wherein said control field includes at least one module indicator which indicates the next analysis module to be executed.

46. The system of claim 40 wherein said control field includes at least one parameter identification which identifies the location of a parameter in a memory.

47. The system of claim 44 wherein said function analyzes the parameter value stored in said memory location.

48. The system of claim 44 wherein said control field further includes at least one predetermined value and said function writes said predetermined value into said memory location.

49. A system for compiling and executing at least one analysis used to control an industrial process, said system comprising:

means for providing a plurality of high-level analysis primitives each of which includes a build procedure and a do procedure;

means for compiling a plurality of control-level analysis modules using the build procedure of at least one of said high-level analysis primitives, said control-level analysis modules forming a tree structure which represents said at least one analysis; and means for executing each control-level analysis module in said tree structure using the do procedure of the high-level analysis primitive which was used to compile said control-level analysis module.

50. The system of claim 49 further comprising:

means for providing a plurality of low-level analysis primitives;

means for compiling a plurality of low-level analysis modules using said low-level analysis primitives;

means for compiling a plurality of high-level analysis modules using said low-level analysis modules, each of said high-level analysis modules including a build procedure and a do procedure;

means for compiling a plurality of new control-level analysis modules using the build procedure of at least one of said high-level analysis modules, said new control-level analysis modules being added to said tree structure; and means for executing each new control-level analysis module in said tree structure using the do procedure of the high-level analysis module which was used to compile said new control-level analysis module.

51. The system of claim 50 wherein said high-level analysis primitives and said low-level analysis primitives are built-in functions.

52. The system of claim 50 wherein said high-level analysis modules and said low-level analysis modules are user-defined functions.

* * * * *

UNITED STATES PATENT AND TRADEMARK OFFICE
CERTIFICATE OF CORRECTION

PATENT NO. : 6,134,304
DATED : October 17, 2000
INVENTOR(S) : Lennart Bror Norell It is certified that error appears in the above-identified patent and that said Letters Patent is hereby corrected as shown below:

Title page,
Item [56], References Cited, OTHER PUBLICATIONS, please add:

-- Kogge, "An Architectural Trail to Threaded-Code Systems" Computer, March, 1982 IEEE, pp. 22-32.

Laffey, "The Real-Time Expert", BYTE, January 1991, pp. 259-264.

Harbison, "Modula-3", BYTE, November 1990, pp. 385-392.

Cox, "There Is a Silver Bullet", BYTE, October 1990, pp. 209-218.

Gibson, "Objects-Born and Bred", BYTE, October 1990, pp. 245-254.

Harris, "FORTH Extensibility - Or How to Write a Compiler in 25 Words or Less, BYTE, August 1980, pp. 164-196.

Rather & Moore, "High-level Programming Technique for Microprocessors", Software, pp. 50-62.

Proceedings of the 26th Intersociety Energy Conversion Engineering Conference, Vol. 1, 4-9 August 1991, Boston, US, "A Code For Conducting System-Level Survivability Analysis of Nuclear Power Systems", by John R. Lilley, Jr. and Agnes Greb, pages 201-205.

Patent Abstracts of Japan, Vol. 13, No. 548, E-856, abstract of JP, A, 1-227552 (FUJITSU LTD), 11 Sept 1989.

UNITED STATES PATENT AND TRADEMARK OFFICE
CERTIFICATE OF CORRECTION

PATENT NO. : 6,134,304
DATED : October 17, 2000
INVENTOR(S) : Lennart Bror Norell It is certified that error appears in the above-identified patent and that said Letters Patent is hereby corrected as shown below:

<u>Column 48,</u>
Line 18, replace "44" with -- 46 --
Line 20, replace "44" with -- 46 --

Signed and Sealed this

Twenty-fifth Day of June, 2002

*Attest:*

*Attesting Officer*

JAMES E. ROGAN
*Director of the United States Patent and Trademark Office*